(12) United States Patent
Fu et al.

(10) Patent No.: US 9,522,772 B2
(45) Date of Patent: Dec. 20, 2016

(54) INSULATING PACKAGING

(75) Inventors: Thomas Fu, Naperville, IL (US); Matthew R. Cook, Oak Brook, IL (US)

(73) Assignee: LBP Manufacturing LLC, Cicero, IL (US)

(*) Notice: Subject to any disclaimer, the term of this patent is extended or adjusted under 35 U.S.C. 154(b) by 222 days.

(21) Appl. No.: 13/532,489

(22) Filed: Jun. 25, 2012

(65) Prior Publication Data

US 2012/0285972 A1    Nov. 15, 2012

Related U.S. Application Data

(63) Continuation-in-part of application No. 12/490,121, filed on Jun. 23, 2009, which is a continuation-in-part of application No. 11/728,973, filed on Mar. 27, 2007.
(Continued)

(51) Int. Cl.
*B65D 81/38* (2006.01)
*B65D 5/42* (2006.01)
(Continued)

(52) U.S. Cl.
CPC ............. *B65D 81/3869* (2013.01); *B31B 1/00* (2013.01); *B65D 5/18* (2013.01); *B65D 5/667* (2013.01); *B65D 81/3853* (2013.01); *B65D 81/3858* (2013.01); *B65D 81/3874* (2013.01); *B65D 81/3881* (2013.01); *B65D 81/3886* (2013.01); *B05B 13/0242* (2013.01); *B29K 2105/165* (2013.01); *B31B 2201/622* (2013.01);
(Continued)

(58) Field of Classification Search
USPC .................................. 229/403, 146; 428/168
See application file for complete search history.

(56) References Cited

U.S. PATENT DOCUMENTS

| 1,295,300 A | 2/1919 | Galibert |
| 2,661,889 A | 7/1948 | Phinney |
| (Continued) | | |

FOREIGN PATENT DOCUMENTS

| CA | 2647912 A1 | 11/2007 |
| CA | 2766553 | 12/2010 |
| (Continued) | | |

OTHER PUBLICATIONS

Canadian Examiner's Report from corresponding Canadian patent application No. CA 2,766,553, 2pgs., dated Jan. 16, 2013.
(Continued)

*Primary Examiner* — Christopher Demeree
(74) *Attorney, Agent, or Firm* — Fitch, Even, Tabin & Flannery LLP

(57) ABSTRACT

A clamshell container includes a bottom portion and a top portion. The bottom portion includes a bottom wall and a side wall attached to the bottom wall. The bottom wall and the side wall form a bottom recessed area. The top portion is connected with the bottom portion along a fold line. The top portion is configured to fold over at least part of the bottom portion at the fold line to form a storage area between the top portion and the bottom recessed area. The top portion and the bottom portion are constructed of a first layer and a second layer attached to the first layer by an insulating material. The insulating material includes microencapsulated particles to expand and provide thermal insulation.

22 Claims, 31 Drawing Sheets

Related U.S. Application Data

(60) Provisional application No. 60/789,297, filed on Apr. 3, 2006.

(51) Int. Cl.
| | | |
|---|---|---|
| *B65D 5/00* | (2006.01) | |
| *B31B 1/00* | (2006.01) | |
| *B65D 5/66* | (2006.01) | |
| *B65D 5/18* | (2006.01) | |
| *B05B 13/02* | (2006.01) | |
| *B29K 105/16* | (2006.01) | |

(52) U.S. Cl.
 CPC ... *B31B 2201/628* (2013.01); *B31B 2217/062* (2013.01); *B31B 2217/064* (2013.01); *B31B 2217/082* (2013.01)

(56) References Cited

U.S. PATENT DOCUMENTS

| | | | |
|---|---|---|---|
| 2,853,222 A | | 4/1953 | GallaQher |
| 2,998,501 A | | 8/1961 | Edberg |
| 3,037,897 A | | 6/1962 | Pelley |
| 3,237,834 A | | 3/1966 | Davis et al. |
| 3,537,929 A | | 11/1970 | Keith |
| 3,555,232 A | | 1/1971 | Bleackley |
| 3,715,551 A | | 2/1973 | Peterson |
| 3,749,874 A | | 7/1973 | Edgar |
| 3,813,801 A | | 6/1974 | Vander Schaaf |
| 3,988,521 A | | 10/1976 | Fumel et al. |
| 4,261,501 A | | 4/1981 | Watkins et al. |
| 4,435,344 A | | 3/1984 | Iioka |
| 4,483,889 A | | 11/1984 | Andersson |
| 4,783,287 A | | 11/1988 | Eichberger |
| 5,145,107 A | | 9/1992 | Silver et al. |
| 5,249,736 A | * | 10/1993 | Eisman ............... 229/110 |
| 5,326,019 A | | 7/1994 | Wolff |
| 5,385,260 A | | 1/1995 | Gatcomb |
| 5,431,333 A | | 7/1995 | Lorenz |
| 5,490,631 A | | 2/1996 | Iioka |
| 5,542,599 A | | 8/1996 | Sobol |
| 5,685,480 A | | 11/1997 | Choi |
| 5,697,550 A | | 12/1997 | Varano et al. |
| 5,705,238 A | * | 1/1998 | Andersen et al. ......... 428/34.5 |
| 5,775,577 A | | 7/1998 | Titus |
| 5,826,786 A | | 10/1998 | Dickert |
| 5,908,152 A | | 6/1999 | Tullis |
| 5,950,917 A | | 9/1999 | Smith |
| 5,952,068 A | | 9/1999 | Neale et al. |
| 5,993,705 A | | 11/1999 | Grishchenko |
| 6,027,018 A | | 2/2000 | Yocum |
| 6,039,682 A | | 3/2000 | Dees |
| 6,152,363 A | | 11/2000 | Rule, Jr. |
| 6,182,890 B1 | | 2/2001 | Sattler et al. |
| 6,186,394 B1 | | 2/2001 | Dees |
| 6,224,954 B1 | | 5/2001 | Mitchell |
| 6,257,485 B1 | | 7/2001 | Sadlier et al. |
| 6,265,040 B1 | | 7/2001 | Neale et al. |
| 6,267,837 B1 | | 7/2001 | Mitchell |
| 6,277,454 B1 | | 8/2001 | Neale et al. |
| 6,287,247 B1 | | 9/2001 | Dees |
| 6,287,410 B1 | | 9/2001 | Klemarewski |
| 6,437,303 B1 | | 8/2002 | Dorr et al. |
| 6,536,657 B2 | | 3/2003 | Van Handel |
| 6,586,075 B1 | | 7/2003 | Mitchell |
| 6,729,534 B2 | | 5/2004 | Van Handel |
| 6,787,245 B1 | | 9/2004 | Hayes |
| 6,802,938 B2 | | 10/2004 | Mohan et al. |
| 6,811,843 B2 | | 11/2004 | DeBraal et al. |
| 6,919,111 B2 | | 7/2005 | Swoboda et al. |
| 6,926,197 B2 | | 8/2005 | Hed et al. |
| 7,074,466 B2 | | 7/2006 | DeBraal et al. |
| 7,281,650 B1 | | 10/2007 | Milan |
| 7,451,911 B2 | | 11/2008 | Stepanek, Jr. |
| 7,464,856 B2 | | 12/2008 | Van Handel |
| 7,464,857 B2 | | 12/2008 | Van Handel |
| 7,597,246 B2 | | 10/2009 | Stepanek, Jr. |
| 7,600,669 B2 | | 10/2009 | Van Handel |
| 7,614,993 B2 | | 11/2009 | Van Handel |
| 2002/0068139 A1 | | 6/2002 | Polak et al. |
| 2002/0071947 A1 | | 6/2002 | Soane et al. |
| 2002/0172784 A1 | | 11/2002 | DeBraal |
| 2002/0172818 A1 | | 11/2002 | DeBraal et al. |
| 2002/0182347 A1 | | 12/2002 | DeBraal et al. |
| 2003/0003251 A1 | | 1/2003 | DeBraal et al. |
| 2004/0011801 A1 | | 1/2004 | Rodriguez |
| 2005/0003122 A1 | | 1/2005 | DeBraal et al. |
| 2005/0230405 A1 | | 10/2005 | Dix |
| 2005/0236468 A1 | | 10/2005 | Sadlier |
| 2006/0131316 A1 | | 6/2006 | Bresler |
| 2006/0144915 A1 | | 7/2006 | Sadlier |
| 2006/0196923 A1 | | 9/2006 | Tedford, Jr. |
| 2007/0017440 A1 | | 1/2007 | Tang |
| 2007/0029036 A1 | | 2/2007 | Fort |
| 2007/0090116 A1 | | 4/2007 | XueBin |
| 2007/0098962 A1 | | 5/2007 | Laprade |
| 2007/0228134 A1 | | 10/2007 | Cook |
| 2008/0023538 A1 | | 1/2008 | Robertson et al. |
| 2008/0078825 A1 | | 4/2008 | Puls |
| 2008/0087677 A1 | | 4/2008 | Robertson |
| 2008/0121681 A1 | | 5/2008 | Wiedmeyer |
| 2008/0251487 A1 | | 10/2008 | Semersky |
| 2009/0121007 A1 | | 5/2009 | Van Handel |
| 2009/0214837 A1 | | 8/2009 | Albenice |
| 2009/0272736 A1 | | 11/2009 | Cole |
| 2009/0294520 A1 | | 12/2009 | Stepanek |
| 2009/0321508 A1 | | 12/2009 | Fu |
| 2010/0015374 A1 | | 1/2010 | Fulwiler |
| 2010/0032474 A1 | | 2/2010 | Burton et al. |
| 2010/0044424 A1 | | 2/2010 | Van Handel |
| 2010/0196610 A1 | | 8/2010 | Chang |
| 2011/0081509 A1 | | 4/2011 | Chang |
| 2012/0048450 A1 | | 3/2012 | Fu |
| 2012/0092091 A1 | | 4/2012 | Kang |

FOREIGN PATENT DOCUMENTS

| | | |
|---|---|---|
| CN | 201062138 | 5/2008 |
| DE | 2043418 A1 | 3/1972 |
| EP | 0818305 A2 | 1/1998 |
| FR | 2516447 A1 | 5/1983 |
| FR | 2865476 | 1/2004 |
| GB | 1116349 A | 6/1968 |
| GB | 2463881 A | 3/2010 |
| JP | H08175576 | 7/1996 |
| JP | 2000302178 | 10/2000 |
| JP | 2002173182 A | 6/2002 |
| JP | 2003154589 | 5/2003 |
| JP | 2003155077 | 5/2003 |
| JP | 2003-531928 | 10/2003 |
| JP | 2005119733 A | 5/2005 |
| JP | 2005-517078 | 6/2005 |
| JP | 2007056080 A | 3/2007 |
| KR | 20110123720 | 11/2011 |
| TW | 215666 | 11/1993 |
| WO | WO 00/06637 | 2/2000 |
| WO | WO 00/15405 | 2/2000 |
| WO | 0211967 A1 | 2/2002 |
| WO | WO 2004/113613 A1 | 12/2004 |
| WO | WO 2005/102847 A1 | 11/2005 |
| WO | WO 2006/107636 A1 | 10/2006 |
| WO | WO 2006/113403 A2 | 10/2006 |
| WO | WO 2007/018899 A2 | 2/2007 |
| WO | WO 2007/027712 A1 | 3/2007 |
| WO | WO 2007/126783 A1 | 11/2007 |
| WO | 2008124193 A1 | 10/2008 |
| WO | 2010039466 A2 | 4/2010 |
| WO | WO 2010/151456 A1 | 12/2010 |

(56) References Cited

FOREIGN PATENT DOCUMENTS

WO    WO 2012/033998 A2    3/2012
ZA          9900835       2/1999

OTHER PUBLICATIONS

Office Action from corresponding Chinese patent application No. 200780018298.7, 18pp., Feb. 2010.
Office Action from corresponding Chinese patent application No. 200780018298.7, 12pp., Aug. 11, 2010.
Taiwanese Office Action from corresponding Taiwanese patent application No. 96111303, 5pp., Jun. 7, 2010.
Partial European Search Report from corresponding European Patent Application No. EP 10 00 6809, 8pp. dated Sep. 2010.
English Translation and Examination Report from corresponding Vietnamese Patent Application No. 1-2008-02687, 1p., dated Sep. 2010.
European Examination Report from corresponding European patent application No. 07754092.0, 2pp., dated Jan. 19, 2009.
Examination Report from Corresponding New Zealand patent application No. 571637, 2pp., dated Mar. 5, 2010.
Further Examination Report from Corresponding New Zealand patent application No. 571637, 2pp., dated Jul. 1, 2010.
Examination Report from corresponding Russian patent application No. 2008141055, 4pp., dated Oct. 14, 2009.
Written Opinion from corresponding Singapore patent application No. 200807307-4, 8pp., dated Feb. 17, 2009.
Examination Report from corresponding Singapore patent application No. 200807307-4, 5pp., dated Oct. 30, 2009.
International Preliminary Examination Report on Patentability from corresponding international application No. PCT/US2007/007521, 6pp., dated Oct. 8, 2008.
Written Opinion and International Search Report from corresponding international application No. PCT/US2007/007521, dated Sep. 13, 2007, 6pp.
Examination Report, from corresponding Turkish patent application No. 2008/09185, 3pp., dated May 28, 2009.
Search Report and Written Opinion from corresponding Singapore Patent Application No. 2010001881, 18pp., dated Jun. 29, 2010.
International Search Report and Written Opinion from corresponding International patent application No. PCT/US2010/038677, 13pp., dated Sep. 24, 2010.
Chinese Office Action from corresponding Chinese patent application 200780018298.7, 11pp., dated May 16, 2011.
New Zealand Examination Report from corresponding New Zealand Patent Application No. 593231, 2pp., Dated Jun. 9, 2011.
Examination Report from corresponding Australian patent application No. 2007245165, dated Sep. 17, 2011.
Examination Report from corresponding New Zealand patent application No. 593231, 2pgs.,dated Sep. 16, 2011.
Examination Report from corresponding Malaysian patent application No. PI20083914, 2pgs., dated Sep. 15, 2011.
International Preliminary Examination Report on Patentability and Written Opinion of the International Search Authority from corresponding International Application No. PCT/US2010/038677, dated Jan. 12, 2012.
Chinese Office Action from corresponding Chinese Patent Application No. 200780018298.7, 3pp., dated Jan. 20, 2012.
Chinese Office Action from corresponding Chinese patent application 200780018298.7, 9pp., dated Aug. 27, 2012.
Japanese Office Action from corresponding Japanese Patent Application No. 2009-504204, 5pp., dated Sep. 10, 2012.
Japanese Office Action from corresponding Japanese Patent Application No. 2009-504204, 9pp., dated May 7, 2012.
Philippine Office Action from corresponding Philippine patent application No. 1-2008-502222, May 14, 2012.
Patent Examination Report from corresponding Australian Patent Application No. 2012200444, 3 pp., Jun. 26, 2012.
Written Opinion from corresponding Singapore patent application No. 201109426-5, 4pp., dated Jul. 26, 2012.
Preliminary Report on Patentability and Written Opinion dated Jan. 8, 2015 for corresponding International Application No. PCT/US2013/046616 (8 pages).
Examination Report dated Jul. 21, 2015 for corresponding European Patent Application No. 10-725-580.4 (4 pages).
Examination Report from corresponding Singapore patent application No. 200807307-4, 5pp., dated Oct. 1, 2009.
International Preliminary Report on Patentability dated Jun. 16, 2015, for corresponding International Application No. PCT/US2013/050928, filed Jul. 17, 2013 (13 pages).
International Preliminary Report on Patentability for International Application No. PCT/US2011/048928, mailed Mar. 14, 2013 (14 pages).
Invitation to Pay Additional Fees and, Where Applicable, Protest Fee and Communication Relating to the Results of the Partial International Search for International Application No. PCT/US2011/048928, dated Mar. 27, 2012 (9 pages).
Invitation to Pay Additional Fees and, Where Applicable, Protest Fee and Partial International Search for corresponding International Application No. PCT/US2013/050928, mailed Oct. 30, 2013, 7 pages.
International Search Report and Written Opinion of the International Searching Authority from corresponding International Application No. PCT/US2015/045299 dated Jan. 26, 2016, 17 pages.
Office Action from corresponding Chinese patent application No. 201380044374.7 dated Jun. 23, 2016, 6 pages.
Office Action issued in related Chinese Application No. 201410708435.1 dated Sep. 5, 2016, 8 pages.

* cited by examiner

INSULATING PACKAGING

RELATED APPLICATIONS

The present patent application is a continuation-in-part of U.S. patent application Ser. No. 12/490,121 filed Jun. 23, 2009, which is a continuation-in-part of U.S. patent application Ser. No. 11/728,973 filed Mar. 27, 2007 and which claims the benefit of the filing date under 35 U.S.C. §119(e) of provisional U.S. patent application Ser. No. 60/789,297, filed Apr. 3, 2006, all of which are incorporated by reference herein.

BACKGROUND

Consumers frequently purchase ready-made products, such as food and beverages, in containers. Thermally insulated containers may be designed for hot or cold liquids or foods, such as hot coffee, iced-tea, or pizza. These containers may maintain the temperature of the liquid or food contents by reducing heat or cold transfer from the contents to the consumer's hand.

BRIEF SUMMARY

A clamshell container includes a bottom portion and a top portion. The bottom portion includes a bottom wall and a side wall attached to the bottom wall. The bottom wall and the side wall form a bottom recessed area. The top portion is connected with the bottom portion along a fold line. The top portion is configured to fold over at least part of the bottom portion at the fold line to form a storage area between the top portion and the bottom recessed area. The top portion and the bottom portion are constructed of a first layer and a second layer attached to the first layer by an insulating material. The insulating material includes microencapsulated particles to expand and provide thermal insulation.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead is placed upon illustrating principles. In the figures, like referenced numerals may refer to like parts throughout the different figures unless otherwise specified.

DETAILED DESCRIPTION

A variety of packaging and containers may be constructed of, and/or insulated with an insulating material. Examples of packaging or containers may include, for example, a clamshell carton, a box, a folding carton, a bowl or soup holder, a French fry receptacle, or various other containers or packaging. Packaging or containers may be made of or include one or more of corrugated paper, uncorrugated paper, corrugated board, uncorrugated board, solid paperboard, laminated paperboard, multilayer paper or paperboard, or various other papers, paperboards, cardboards, or other products.

The insulating material may be fixed to a container or it may be applied to a removable sleeve. Insulating material, such as thermally-expandable and/or void containing additive materials may be applied to the container or an outer wall or both. The insulating material may be expanded before reaching an end user, such as when the container and/or container sleeve are manufactured, and/or the insulating material may be expanded only on end use and only in response to, for example, temperature. The insulating material may be used to aid with insulating capabilities of the container and/or container sleeve, and/or to add rigidity to the container and/or the container sleeve, such as to reduce a thickness of the material components of container and/or container sleeve.

Figure 1:
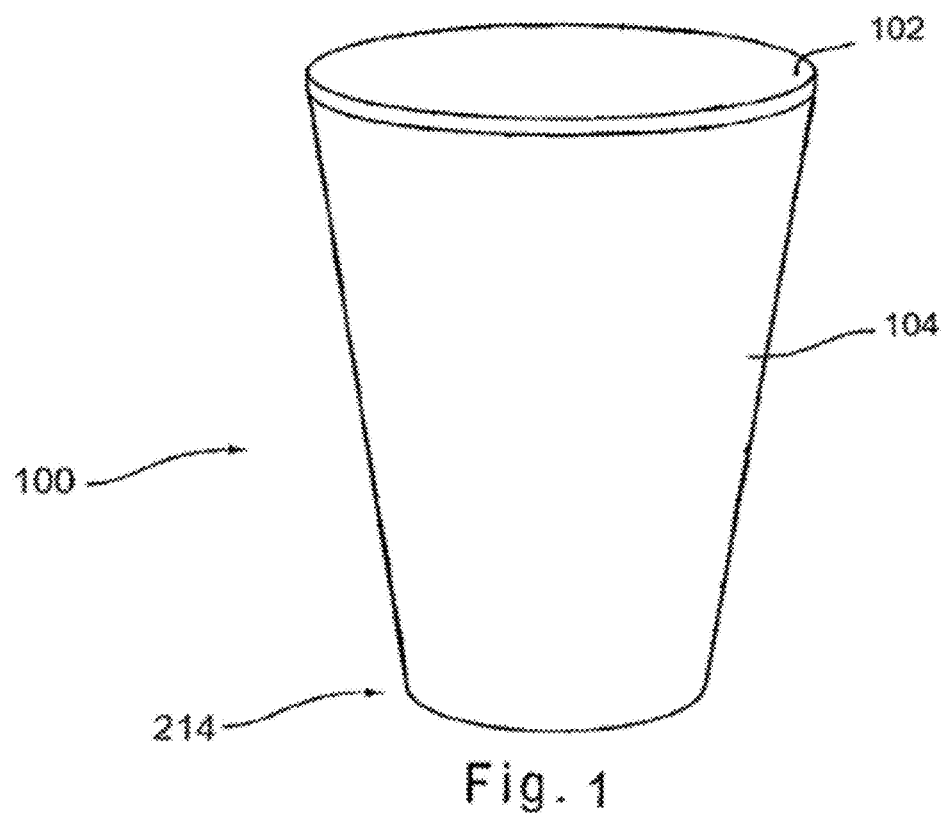
FIG. 1 is a perspective view of a cup assembled with an outer wall.

FIG. 1 illustrates a container 100, such as a cup, with an inner wall 102 and an outer wall 104. The blank for the outer wall 104 may be in the form of a container sleeve or a wall or body of a container 100. The container is not limited to a cup and may be any other container, including but not limited to, a bulk coffee container, a soup tub, press-formed containers, plate, sleeve (e.g., single face corrugated, double face corrugated, uncorrugated, cardboard, etc.), folding cartons, trays, bowls, clamshells, and others with or without covers or sleeves. The container 100 may be a cylindrical cup or a container having other geometrical configurations, including conical, rectangular, etc. The outer wall 104 blank is not limited to a corrugated die cut blank, and may be constructed of any kind of paperboard, paper, foil, film, fabric, foam, plastic, and etc. The outer wall 104 may be made of any nominal paper stock, including but not limited to, natural single-face, white-topped single face, coated bleached top single-face, corrugate, fluted corrugate or any combination of these. The outer wall 104 may be removable from the container 100 or the outer wall 104 may be adhered to the container 100. The outer wall 104 may be adhered, for example, by laminating the outer wall 104 blank onto the container, using a hot melt, cold melt and/or any other adhesive or sealing mechanisms. Alternatively or in addition, the outer wall 104 blank may be adhered with an insulating material. If the outer wall 104 is attached to the cup during manufacture, it may increase efficiency by eliminating an assembly step by the commercial end-user. Further, it may decrease the amount of storage space required by the commercial end-user, e.g., storing one item as opposed to two.

FIG. 1 is not necessarily drawn to scale. For example, the outer wall 104 may cover a larger or smaller portion of the container's 100 surface than illustrated. For example, the outer wall 104 may provide full body coverage. Increasing the surface area of the outer wall 104 may provide a larger insulated area as well as a larger print surface. Although the drawing illustrates the outer wall 104 on a cup, the outer wall 104 may be added to any other containers, such as but not limited to, a bulk beverage container, press-formed container, and soup tub. Alternatively or additionally, the outer wall 104 may be added to a container sleeve.

Figure 2:
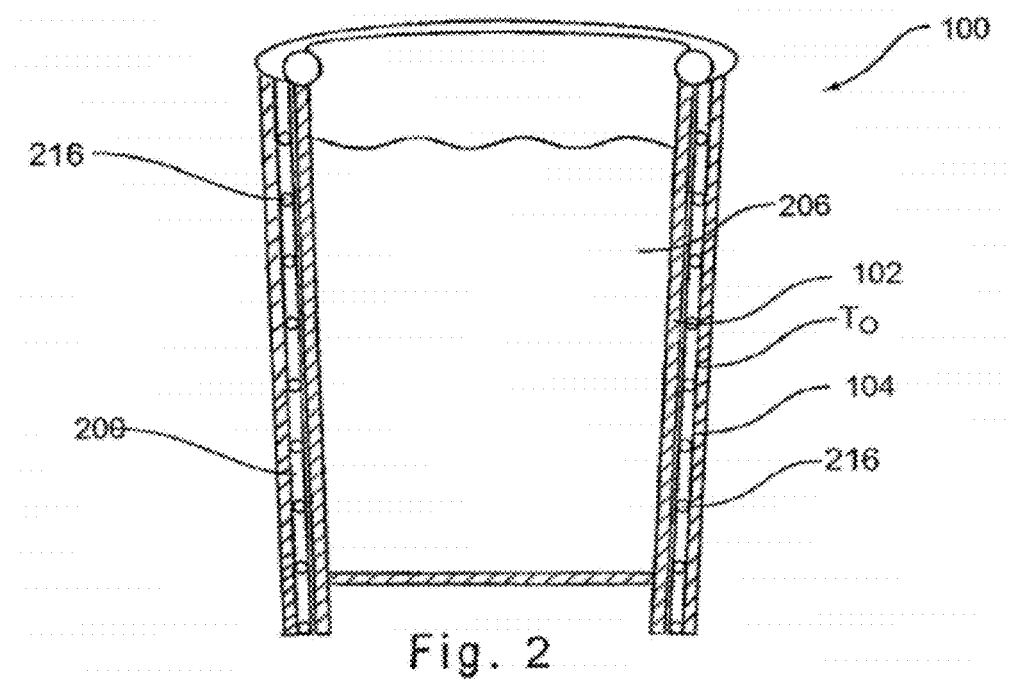
FIG. 2 is a side cutaway view of a double wall cup.

FIG. 2 is a side cutaway view of a container 100, which may be a double wall cup. The container 100 may provide a jacket of air 200 between an outer wall 104 and contents 206, such as a hot or cold beverage or food, of the container 100. The air jacket 200 may provide thermal insulation as measured by an outside surface temperature $T_O$. The air jacket 200 may partially or completely surround the container 100. When the container 100 is grabbed, a pressure exerted on the outer wall 104 may act to collapse the outer wall 104 at pressure points to reduce the air jacket 200 and potentially initiate contact with an inner wall 102 of the container 100. The air jacket 200 may collapse under pressure points and may give a sense of low rigidity, and the contact may create hot spots on the outer wall 104.

An insulating material 216 applied between the inner wall 102 and the outer wall 104 may reduce or eliminate this effect. If a sufficient amount of insulating material 216 is used, the insulating material 216 may act to provide rigidity without compromising the thermal insulation of the air jacket 200 to the outer wall 104 such that the outer wall 104 does not collapse, completely or partially. The insulating material 216 may add mechanical strength to the container 100. Lighter weight materials may be used to produce the container 100 due to mechanical strength added by the insulating material 216, such that the source of a substrate forming the container 100 may be reduced. The insulating material 216 may be applied in spots, such as dots, or another pattern, either on the inner wall 102, the outer wall 104, or both, such that the insulating material 216 defines an air gap 200 and prevents the outer wall 104 from collapsing onto the inner wall 102 under holding pressure. The insulating material 216 may also provide a rigid feel to the user, while allowing a reduction of a substrate material, for example the inner wall 102 or outer wall 104.

The insulating material 216 may expand when activated, or may be pre-expanded, for example, by the inclusion of air or inert gas, in situ air voids, microspheres, expandable microspheres or other foaming agents. The insulating material 216 may be activated by, for example, temperature, pressure, moisture, or otherwise. In one example, the insulating material 216 may be thermally-activatable, by a hot or cold temperature. The insulating material 216 may be an expandable insulating material or adhesive. Additionally or alternatively, the insulating material 216 may include but is not limited to, binder, expandable microspheres or other micro-encapsulated particles, pigment and other additives, adhesives (e.g., hot melt, pressure sensitive), inert gas foamed hot melt, aqueous coating containing heat expandable microspheres, starch-based adhesives, natural polymer adhesives, PVC, foam coatings, biodegradable glues, or any combination of these or other materials. The insulating material 216 may include in-situ air voids, microspheres, microparticles, fibers, expandable fibers, dissolving particles, and etc. The insulating material 216 may be biodegradable, compostable, and/or recyclable.

The insulating material 216 may be expandable when wet or dry. The insulating material 216 may include any synthetic or natural material including aqueous based, solvent based, high solids, or 100% solid materials. The amount of solid content is typically 30% to 80% of the material, and more preferably 40% to 70%. Additional ingredients may be added to the binder and/or insulating material 216, including but not limited to, pigments or dyes, fillers/extenders, surfactants for dispersion, thickeners or solvents to control viscosity for optimized application, foaming agents, defoaming agents, additives like waxes or slip aids, etc. Alternatively, the binder and/or insulating material 216 may be an adhesive. The insulating material 216 may have several properties, including but not limited to thermal insulation to keep container contents hot or cold, absorption of condensation and/or liquid, and/or it may expand on contact with hot material (such as, over 150° F.), and preferably remains inactive before a determined designed activation temperature, such as at about room temperatures. The insulating material 216 may be repulpable, recyclable, and/or biodegradable.

In a further example, the insulating material 216 includes a synthetic or bio-based foam formed with an inert gas such as nitrogen gas. The inert gas, such as nitrogen gas, may be injected into the insulating material 216. For example, an inert gas, such as nitrogen gas, may be injected into a hot-melt adhesive, starch-based adhesive, or natural polymer adhesive may be used. The gas may be applied onto the outer surface of the inner wall 102 before placing the outer wall 104 to give these materials foam structure, and therefore improve the mechanical and thermal insulation properties of the double wall container. The gas may be injected into the insulating material 216, for example, before it is applied to the outer wall 104, or during application to outer wall 104.

Alternatively or additionally, the insulating material 216 may be a coating or adhesive that is combined with a blowing agent or foaming agent. The blowing or foaming agent may generate a gas upon heating which may activate the insulating material 216 to assume, for example, air voids, a cellular structure, or otherwise. Alternatively, the blowing or foaming agent may be a material that decomposes to release a gas under certain conditions such as temperature or pressure. Heating may occur during filling of the container with contents 206, such as hot food or beverage. Alternatively, heating may occur from an external source—such as a microwave or water bath.

Figure 3:
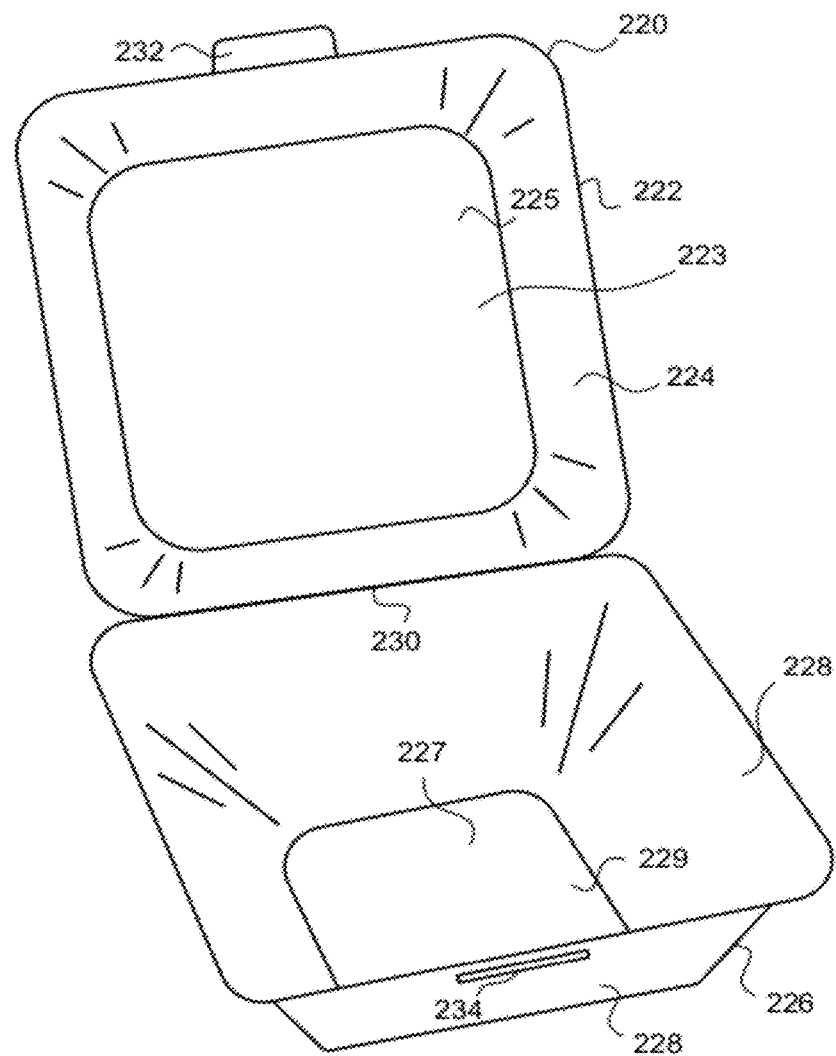
FIG. 3 is a perspective view of a container.
Figure 4:
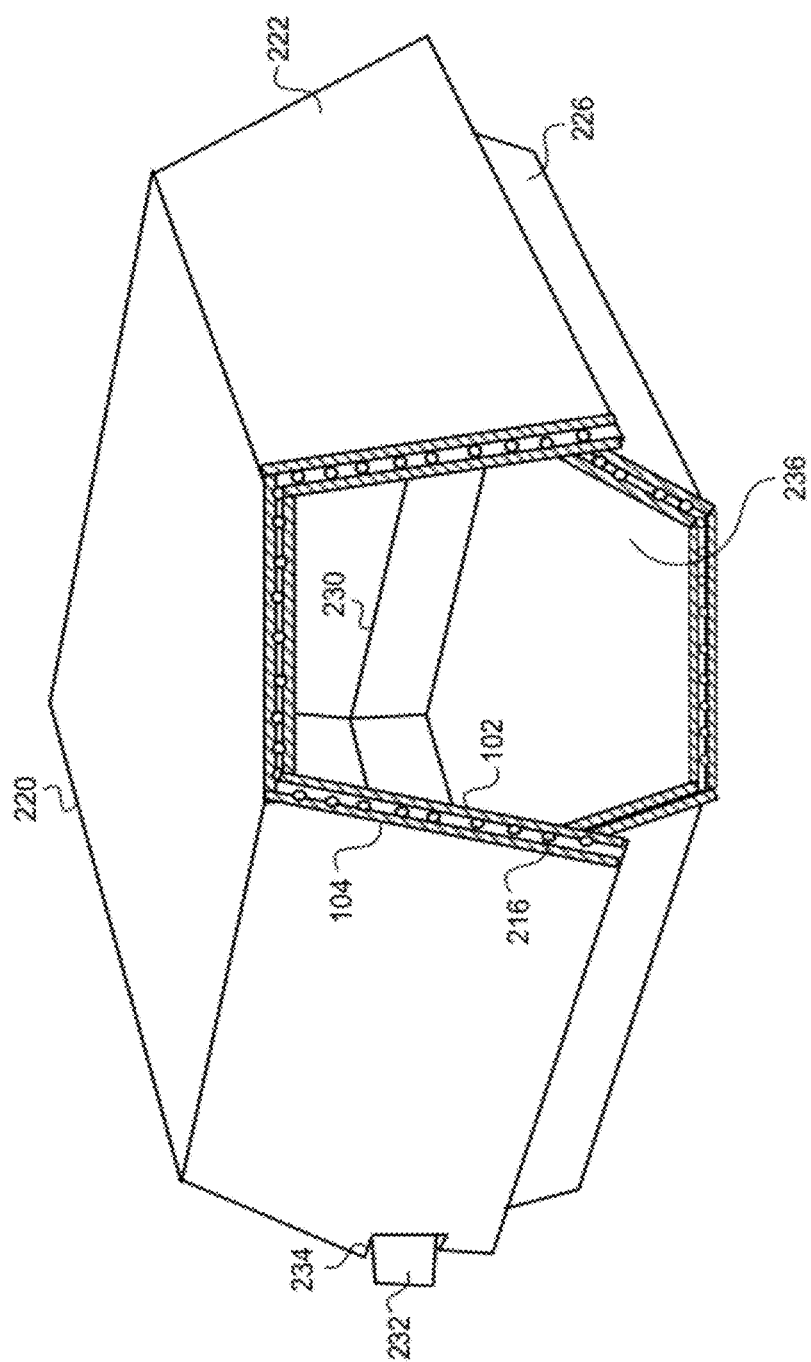
FIG. 4 is a cross-section perspective view of a container.
Figure 6:
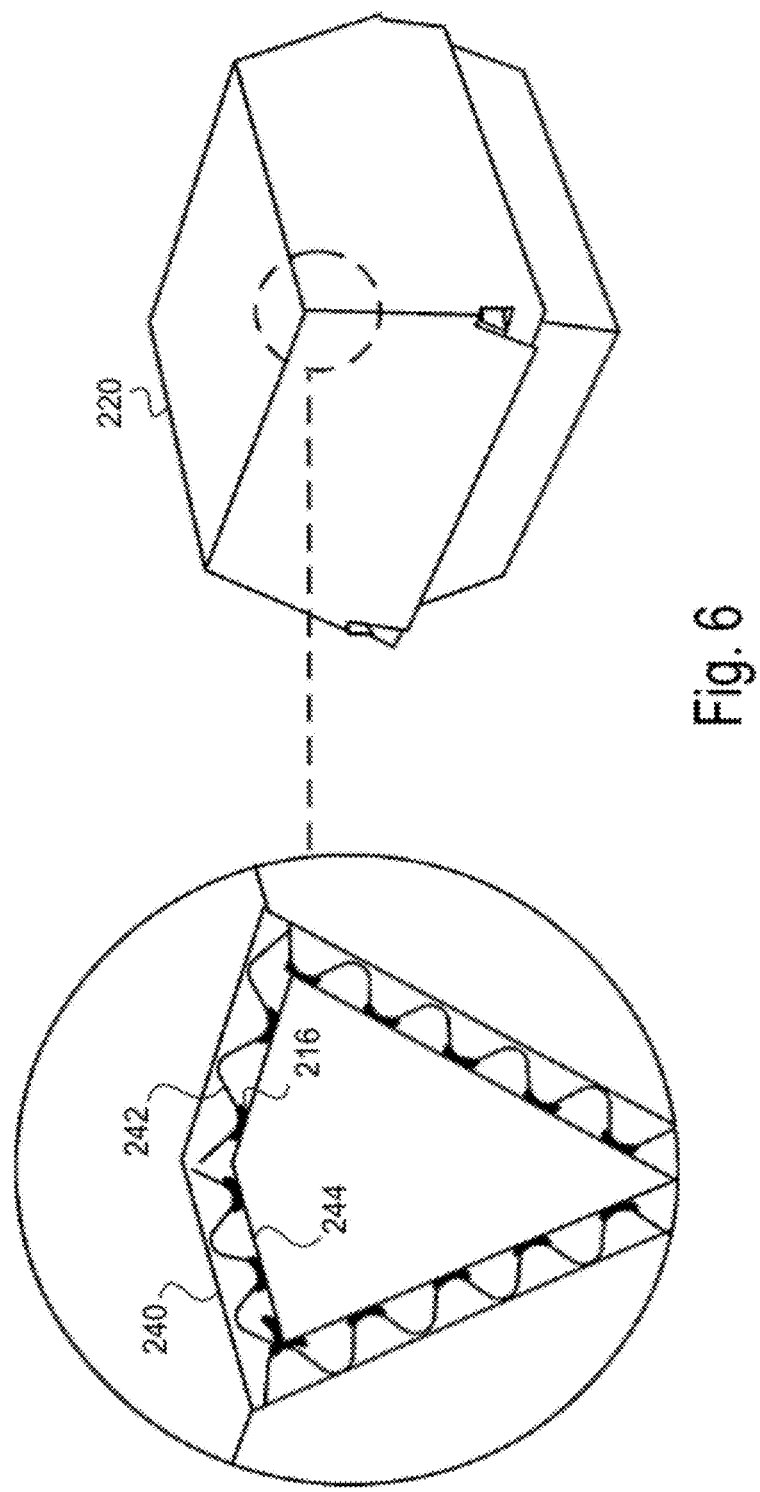
FIG. 6 is a cutaway view of a container.
Figure 7:
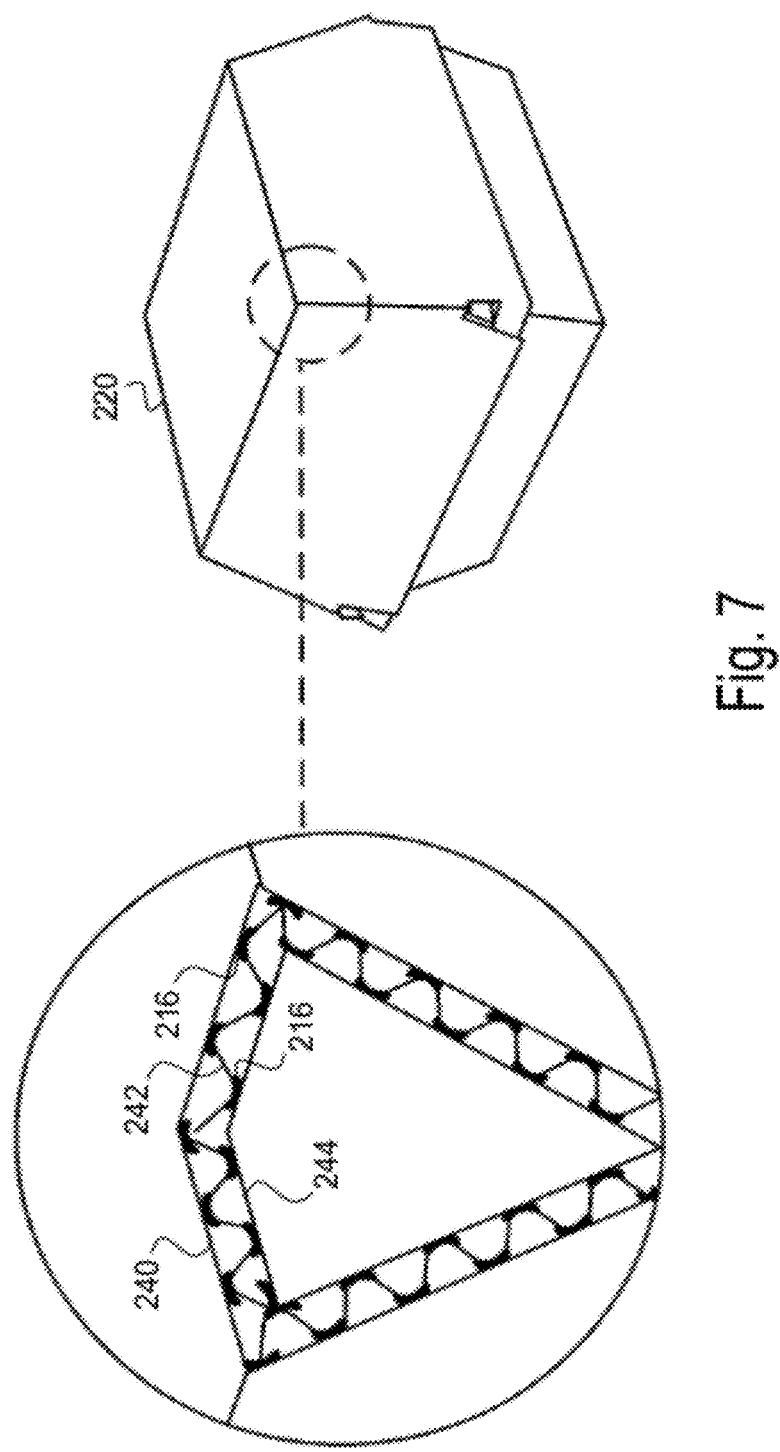
FIG. 7 is a cutaway view of a container.
Figure 8:
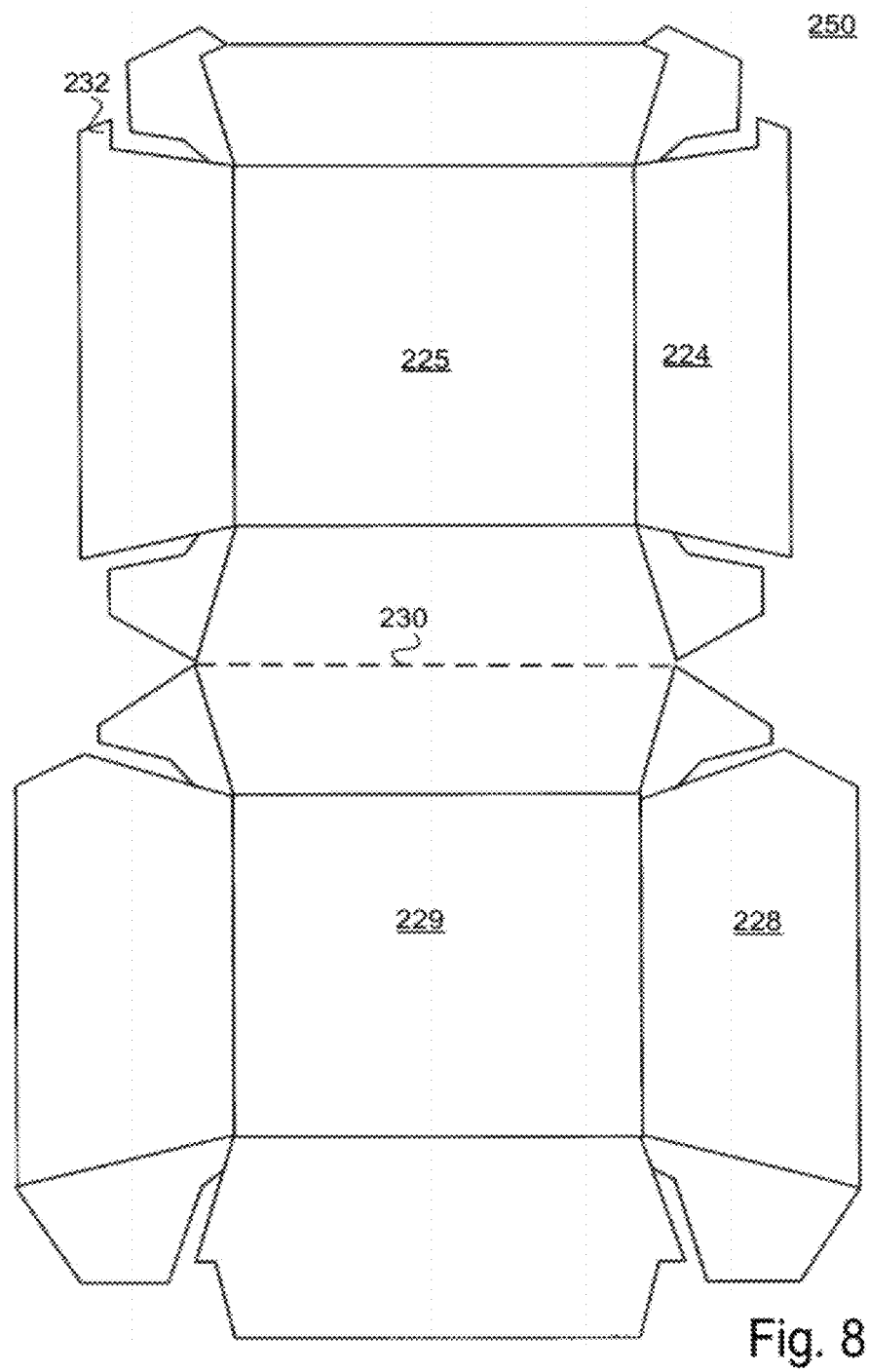
FIG. 8 is a view of a blank of a container.

FIG. 3 is a perspective diagram of an example container 220 in an open position. FIGS. 4-7 are perspective cross-section diagrams of example containers 220 in a closed position. FIG. 8 is an example of a blank 250 that may be used to create a container 220. The container 220 may be a corrugated clamshell carton or box, a foldable carton, or various other shapes.

The container 220 may be constructed from or using one or more blanks, such as blank 250. The blank 250 may be constructed of any kind of paperboard, paper, foil, film, fabric, foam, plastic, or various other materials. As an example, a blank may be made of or include one or more paperboard or paper layers, such as an inner wall 102 and an outer wall 104. The paper layer walls 102 and 104 may be or include one or more of a nominal paper stock, a natural single-face, white-topped single face, coated bleached top single face corrugated paper, double face corrugated paper, uncorrugated paper, cardboard, fluted corrugated paper or any combination of these.

Insulating material 216 may be applied between the inner wall 102 and the outer wall 104 of the container 220. The insulating material 216 may be the same or similar to the insulating material used with the cup 100. The insulating material may provide rigidity without compromising the thermal insulation of the container 220, and/or may add mechanical strength to the container 220. Lighter weight materials may be used to produce the container 220 due to mechanical strength added by the insulating material 216, such that the source of a substrate forming the container 220 may be reduced.

The insulating material 216 may expand when activated, or may be pre-expanded, for example, by the inclusion of air or inert gas, in situ air voids, microspheres, expandable microspheres, thermally expandable microparticles, or other foaming agents. An inert gas, such as nitrogen gas, may be injected into the insulating material 216. The insulating material 216 may be an expandable insulating material or adhesive. Additionally or alternatively, the insulating material 216 may include but is not limited to, a binder, expandable microspheres or other micro-encapsulated particles, pigment and other additives, adhesives (e.g., hot melt, pressure sensitive), inert gas foamed hot melt, aqueous coating containing heat expandable microspheres, starch-based adhesives, natural polymer adhesives, PVC, foam coatings, biodegradable glues, or any combination of these or other materials.

The insulating material 216 may include in-situ air voids, microspheres, microparticles, fibers, expandable fibers, dissolving particles, and etc. The insulating material 216 may be a coating or adhesive that is combined with a blowing agent or foaming agent. The blowing or foaming agent may generate a gas upon heating which may activate the insulating material 216 to assume, for example, air voids, a cellular structure, or otherwise. Alternatively, the blowing or foaming agent may be a material that decomposes to release a gas under certain conditions such as temperature or pressure. Heating may occur during filling of the container 220 with contents, such as hot food or beverage. Alternatively, heating may occur from an external source, such as a microwave or water bath.

The insulating material 216 may be applied in various spots on the blank, such as dots, or another pattern, either on the inner wall 102, the outer wall 104, or both. For example, the insulating material 216 may be applied in a linear or other pattern between two flat or uncorrugated layers, such that that the insulating material 216 may define an air gap and prevents the outer wall 104 from collapsing onto the inner wall 102 under holding pressure. The insulating material 216 may also provide a rigid feel to the user, while allowing a reduction of a substrate material, for example the inner wall 102 or outer wall 104.

Figure 5:
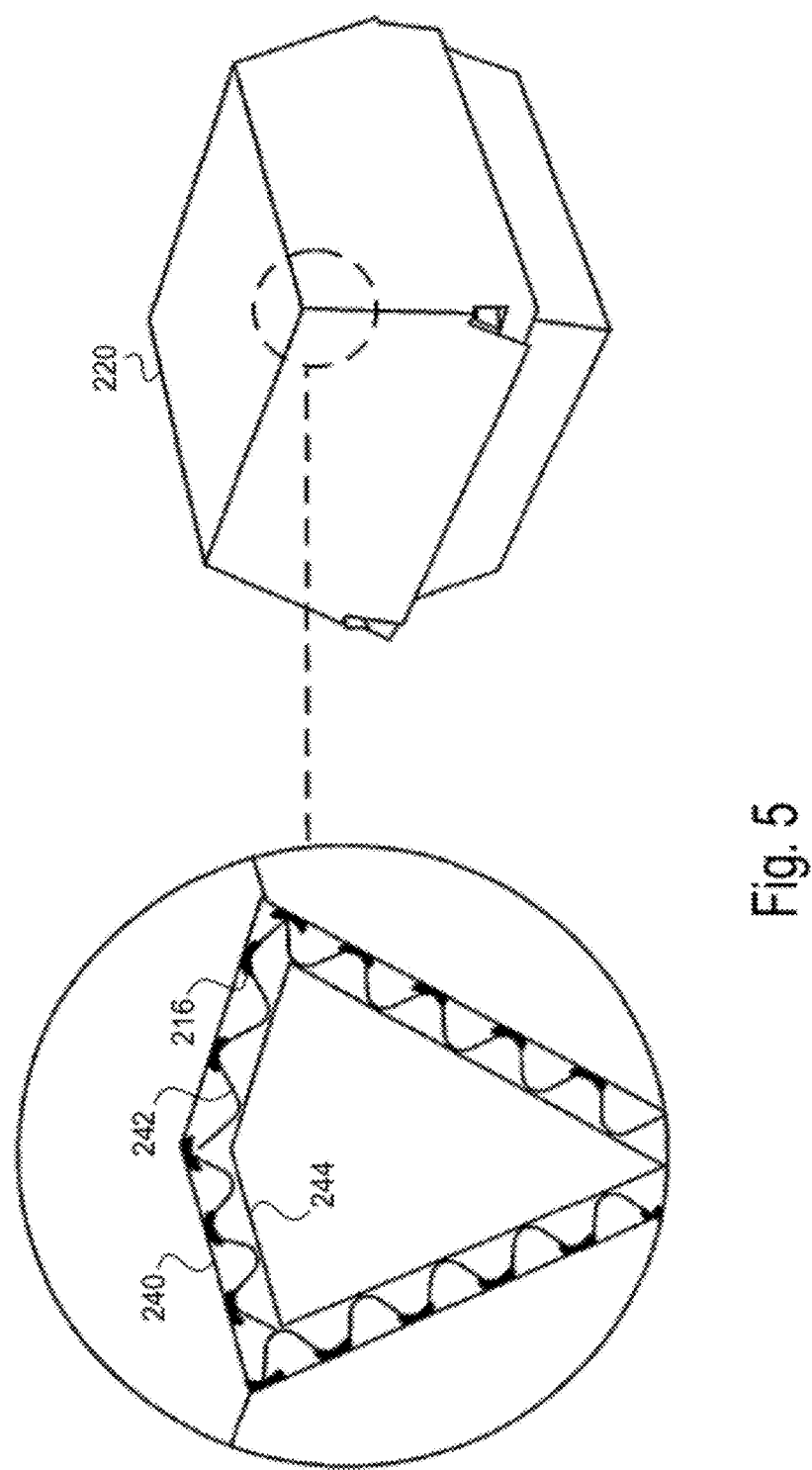
FIG. 5 is a cutaway view of a container.

The container 220 may additionally or alternatively be constructed using one or more fluted or corrugated layers, such as a fluted or corrugated layer 242. The fluted or corrugated layer 242 may be positioned next to one or more flat layers. For example, the fluted or corrugated layer 242 may be positioned between two flat layers 240 and 244. In other examples, the fluted or corrugated layer 242 may be connected with none or only one flat layer.

Where the container is constructed using one or more fluted or corrugated layers, the fluted or corrugated layers may be attached or otherwise connected to one or more flat layer using the insulating material 216. FIG. 5 shows an example container 220 with a fluted or corrugated layer 242 attached to an outer layer 240 using the insulating material 216. FIG. 6 shows an example container 220 with a fluted or corrugated layer 242 attached to an inner layer 244 using the insulating material 215. FIG. 7 shows an example container 220 with a fluted or corrugated layer 242 attached to an outer layer 240 and an inner layer 242 using the insulating material 216. The container 220 may be made of paperboard that may include a single wall microfluted board including a top liner, a bottom liner and a microfluted medium layer bonded to the top and/or bottom liners by a glue containing thermally expandable microspheres. The expandable microspheres may be expanded by heat, and once expanded, may help enhance the thermal insulation and rigidity of the board and the packaging container made of it.

The insulating material 216 may, in some examples, be applied at a point where the fluted or corrugated layer 242 contacts a flat layer, such as the outer layer 240 or the inner layer 244. The insulating material 216 may be applied to a tip, hill, or edge of the flutes or corrugations of the fluted or corrugated layer 242. The tip, hill, or edge of the flute or corrugation may be applied to the flat layer 240 or 244, and the insulating material applied to the tip, hill, or edge may bind the fluted or corrugated layer 242 to the flat layer 240 or 244. The insulating material may be heated to expand and provide insulation between a cargo area 236 and an outer layer 240 of the container 220. Other variations of construction of a blank or substrate used to make the container 220 are possible.

The container 220 may include a top portion 222 and a bottom portion 226. The top portion 222 and the bottom portion 226 may be connected, attached, or in communication with each other. The top portion 222 and the bottom portion 226 may be separated from each other, or adjoined to each other, by a hinge line or fold line 230. In some examples, the top portion 222 and the bottom portion 226 may be made of two layers of flat paperboard attached by insulating material 216, or made of multilayer paperboard, such as paperboard including a single wall microfluted board including a top liner, a bottom liner and a microfluted medium layer bonded to the top and/or bottom liners by a glue containing thermally expandable microspheres.

The top portion 222 may include a pocket, recession, cavity, or recessed area 223. The recessed area 223 may be formed by one or more side walls 224 and a top wall 225 of the top portion 222, and may be configured or capable of holding material, such as food or a liquid. The top wall 225 may be square, rectangular, or various other shapes. One or more edges of the top wall 225 may connect with one or more side walls, such as side wall 224. The side walls 224 may form a right angle, or an obtuse angle, with the top wall 225. For example, the side walls 224 may be angled, forming a concave recession or cavity in the top portion 222.

The bottom portion 226 may also or alternatively include a pocket, recession, cavity, or recessed area 227. The recessed area 227 may be formed by one or more side walls 228 and a bottom wall 229 of the bottom portion 226, and may be configured or capable of holding material, such as food or a liquid. The bottom wall 229 may be square, rectangular, or various other shapes. One or more edges of the bottom wall 229 may connect with one or more side walls, such as side wall 228. In some systems, a side wall 228 may refer to a plurality of side wall panels that may attach to edges of the bottom wall 229, such that the side wall 228 may surround the bottom wall 229. In other systems, a side wall 228 may refer to one wall of a set of side walls that may attach to or surround the bottom wall 229. Other variations are possible.

The one or more side wall 228 may form a right angle, or an obtuse angle, with the bottom wall 229. For example, side walls 228 may be angled, forming a concave recession or cavity in the bottom portion 223. The bottom wall 229 may be flat, or may include one or more ridges or dividers which may segregate one portion of the cavity 227 of the bottom portion 223 from another portion of the cavity. A portion or segment of the container 220 that includes a recessed area may be referred to as a containment portion.

The recessed areas 223 and 227 may be configured so that when the container 220 is arranged in an open position where the top portion 222 is not folded along the fold line 230, the recessed area 223 and the recessed area 227 both recess in the same direction. The recessed areas 223 and 227 may additionally or alternatively be configured such that when the container 220 is arranged in a closed position where the top portion 222 is folded along the fold line 230 over the bottom portion 226, the recessed area 223 recesses in an opposite direction of the recessed area 227. In the closed position, the recessed area 223 and the recessed area 227 may form a storage area 236 bounded by the top portion 222 and the bottom portion 223. In the closed position, the top portion 222 may operate as a cover over the bottom portion 226.

In other variations, one of the top portion 222 or the bottom portion 226 may be flat and/or may not include a recessed area. For example, the top portion 222 may only include a top wall 225 without any side walls. In some containers 220, the top portion 222 may be flat or relatively flat, and the bottom portion 226 may be a containment portion with a recessed area 227. The top portion 222 may be folded over the bottom portion 226 and may operate as a cover over the recessed area 227. Other variations are possible.

The container 220 may include one or more attachment mechanisms, such as attachment mechanism 232 and attachment mechanism 234. Attachment mechanism 232 may be connected, attached, or otherwise in communication with the top portion 222. The attachment mechanism 232 may be positioned on a side or edge (sometimes referred to as an "attachment edge") of the top portion 222 opposite the side with the fold line 230. Attachment mechanism 234 may be connected, attached, or otherwise in communication with the bottom portion 223, such as on an attachment edge of the bottom portion 226 opposite an edge with the fold line 230. The attachment mechanisms 232 and 234 may be generally centered along an edge of the top and bottom portions 222 and 226, or may be positioned in various other positions, such as at or near a corner of the top and bottom portions 222 and 226. The attachment mechanisms 232 and 234 may be positioned such that when the top portion 222 is folded over the bottom portion 226 along the fold line 230, the attachment mechanism 232 may align with or line up with the attachment mechanism 234. Various other positions are possible.

Attachment mechanisms 232 and 234 may be complimentary attachment mechanisms, such that attachment mechanism 232 may be configured to attach or connect with attachment mechanism 234 when the attachment mechanisms 232 and 234 are aligned. For example, the attachment mechanism 232 may be a tab, and the attachment mechanism 234 may be a slot configured to receive the tab 232. In other containers, the attachment mechanisms may alternatively be or include snaps, buttons, slots, tabs, hooks, fasteners, male and female fasteners or attachment devices, or various other attachment mechanisms.

When aligned and attached with each other, the attachment mechanisms 232 and 234 may secure the top portion 222 to the bottom portion 226. The top portion 222 and the bottom portion 226 may form the storage area 236. The storage area 236 may be partially or completely encased by and/or cover the top portion 222 and the bottom portion 226.

Figure 9:
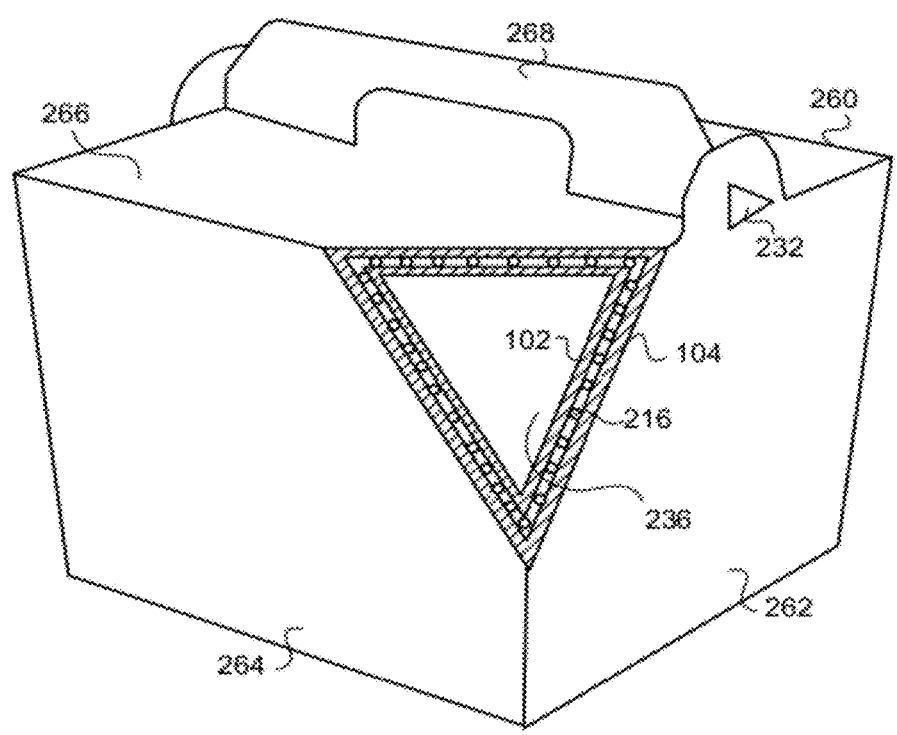
FIG. 9 is a cross-section perspective view of a folding carton.

FIG. 9 is a perspective cross-section diagram of an example folded carton 260 in a closed position. The folded carton 260 may be constructed from or using one or more blank. The blank may be made of the same material or substrate as the blank 250 for the container 220, and/or may be constructed of any kind of paperboard, paper, foil, film, fabric, foam, plastic, or various other materials, and may be similar to or resemble the blank used to form a container 220. The blank may be made of or include one or more paperboard or paper layers, such as an inner wall 102 and an outer wall 104, which may be similar to or resemble the inner wall 102 and outer wall 104 of the container 220. Insulating material 216 may be applied between the inner wall 102 and the outer wall 104 of the folded carton 260. The insulating material 216 may be the same or similar to the insulating material used with the cup 100 or the container 220. In other examples, the folded carton 260 may be made of paperboard including a single wall microfluted board including a top liner, a bottom liner and a microfluted medium layer bonded to the top and/or bottom liners by a glue containing thermally expandable microspheres. Other variations are possible.

The folded carton 260 may include one or more side walls 262 and 264. Side walls may be construed from the blank, and may include an inner wall 102 and an outer wall 104. The side walls 262 and 264 may be connected or attached to each other, a bottom wall, and/or a cover. The side walls 262 and 264, the bottom wall, and/or the cover may bound or form a storage area 236. The storage area 236 may be configured to receive and store material, such as food or beverages.

The cover 266 may be retractable or removable. The cover 266 may be lifted or opened to access the storage area 236. The cover 266 may be secured to a side wall 262 of the folded carton 260 using one or more attachment mechanism 232. In other variations, the storage area 236 may be accessed by or through one of the side walls 262 or 264 or the bottom wall.

The folded carton 260 may include a handle 268. The handle 268 may be attached to or protrude from the cover 266 or a side wall 262 or 264. The handle 268 may be used to carry or transport the folded carton 260. Various other types of containers may include, be constructed with, or use one or more blank, such as a paperboard blank with insulating material applied between two paper layers.

Figure 10:
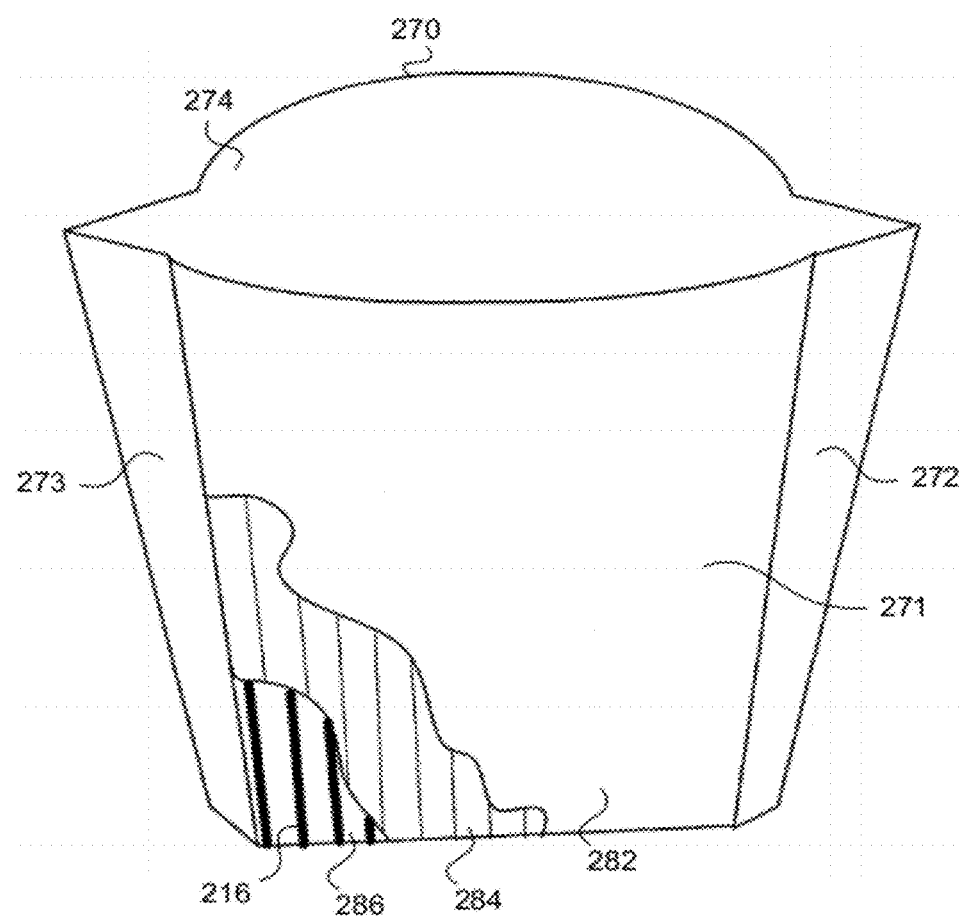
FIG. 10 is a cutaway view of a carton.
Figure 11:
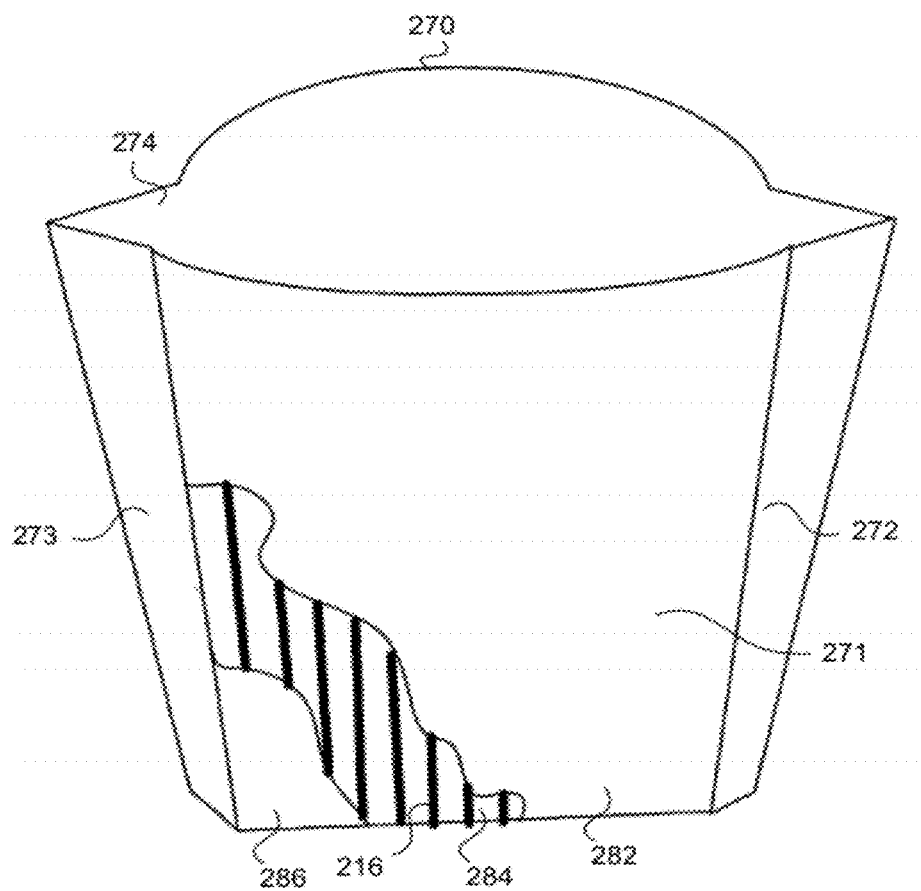
FIG. 11 is a cutaway view of a carton.
Figure 12:
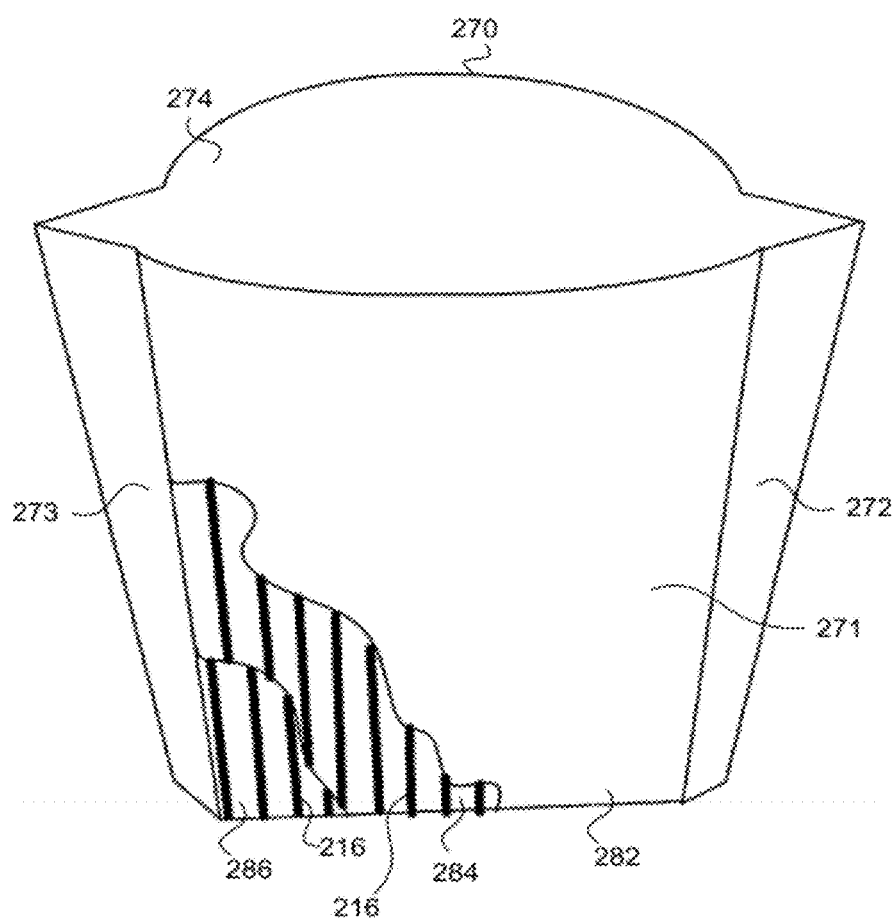
FIG. 12 is a cutaway view of a carton.
Figure 13:
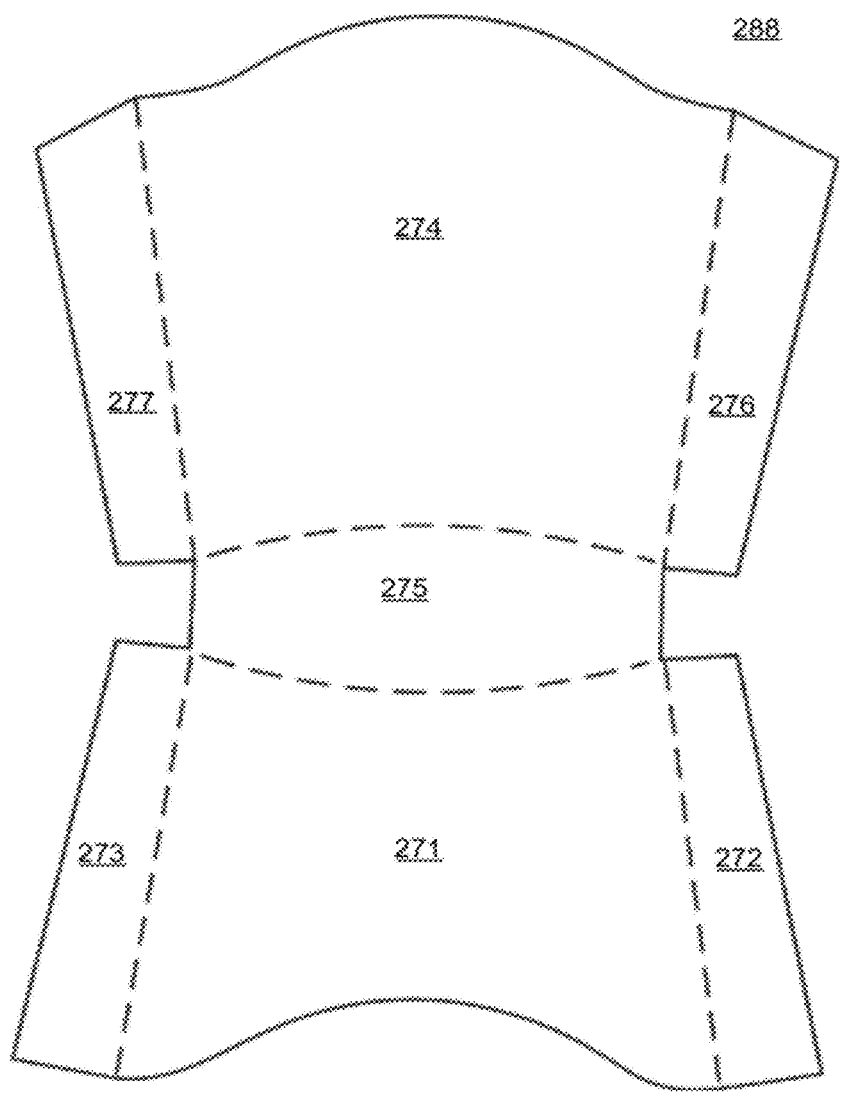
FIG. 13 is a view of a blank of a carton.

FIGS. 10-12 are perspective views of another example carton 270 with a cutout portion. FIG. 13 is a view of an example blank 288 for a carton 270. The carton 270 may, for example, be a French fry carton or other carton.

The carton 270 may include one or more bottom walls 275 and one or more side walls 271, 272, 273, 274, 275, and 276. In some examples, side walls 272 and 276 may be adjoined to form one side wall, while side walls 273 and 277 may be adjoined to form an opposite side wall. Other configurations are possible.

The carton 270 be constructed from or using one or more blank 288. The blank 288 may be made of the same material or substrate as the blank 250 for the container 220, and/or may be constructed of any kind of paperboard, paper, foil, film, fabric, foam, plastic, or various other materials, and may be similar to or resemble the blank used to form a container 220. The blank 288 may be made of paperboard including a single wall microfluted board including an outer liner or outer layer 282, an inner liner or inner layer 286, and a middle layer 284. The outer layer 282 and the inner layer 286 may be flat, such as flat paperboard. The middle layer 284 may be a microfluted or otherwise corrugated medium such as paperboard. The middle layer 284 may be bonded to the outer and/or inner liners 282 and 286, such as by a glue containing thermally expandable microspheres. FIG. 10 shows an example where the middle layer 284 is bound to the inner layer 286 by insulating material 216 applied in a linear pattern along the tips or hills of the fluted middle layer 284. FIG. 11 shows an example where the middle layer 284 is bound to the outer layer 282 by insulating material 216 applied in a linear pattern along the tips or hills of the fluted middle layer 284. FIG. 12 shows an example where the middle layer 284 is bound to both the outer layer 282 and the inner layer 286 by insulating material 216.

In other variations, the blank 288 may be made of or include one or more paperboard or paper layers, such as an inner wall 102 and an outer wall 104, which may be similar to or resemble the inner wall 102 and outer wall 104 of the container 220. Insulating material 216 may be applied between the inner wall 102 and the outer wall 104 of the folded carton 260. The insulating material 216 may be the same or similar to the insulating material used with the cup 100 or the container 220.

The cartons 270 may form a cavity or recessed area between the side walls 271, 272, 273, 274, 276, and 277 and the bottom wall 275. One or more holes, gaps, or openings may exist along a side of the bottom wall 275, such that liquid or grease placed within the recessed area of the carton 270 may escape the carton 270. The carton 270 may include an opening along a top edge of the side walls, such that one or more items may be placed within the carton 270 and stored. For example, hot food may be placed within the cavity of the carton 270. The use of the insulating material 216 with the packaging for the carton 270 may provide rigidity to the walls of the carton and insulating properties, while resulting in a vast reduction in substrate materials. In addition to the container 220, the folded carton 260, and the carton 270, the insulating material 216 may be used with other packaging materials to create various other compartments, carriers, or containers, such as soup tubs, sandwich boxes, beverage containers or carriers, and other containers.

Figure 14:
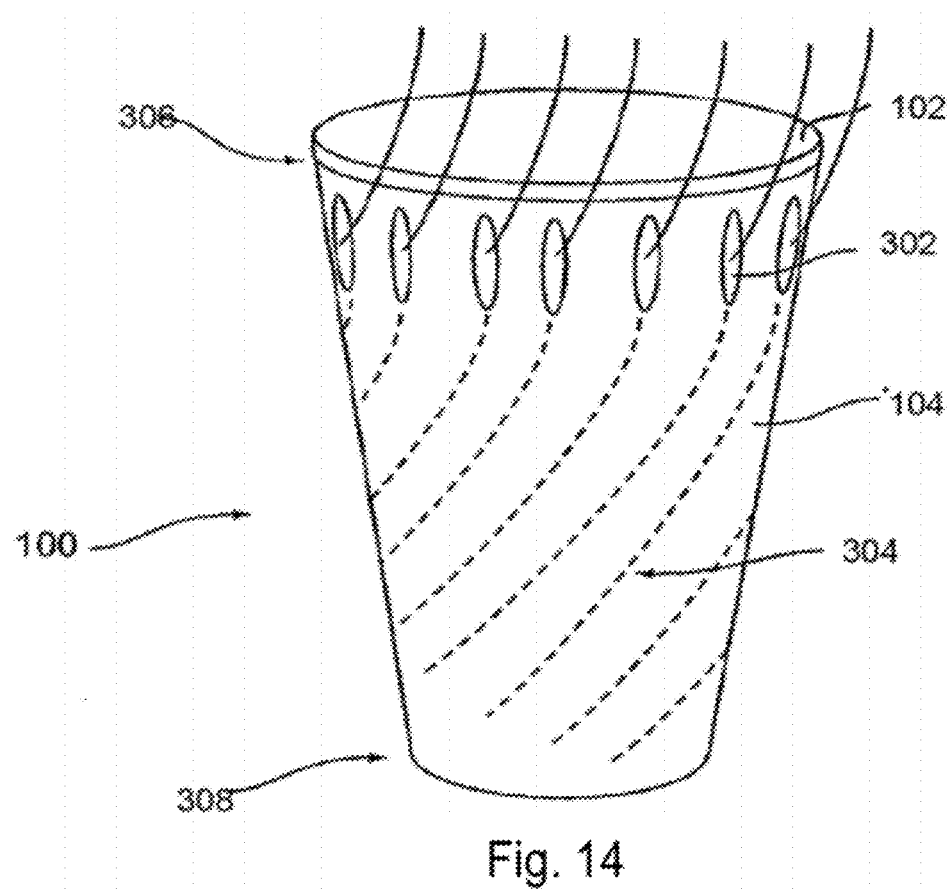
FIG. 14 is a perspective view of an integrated container with channels.
Figure 15:
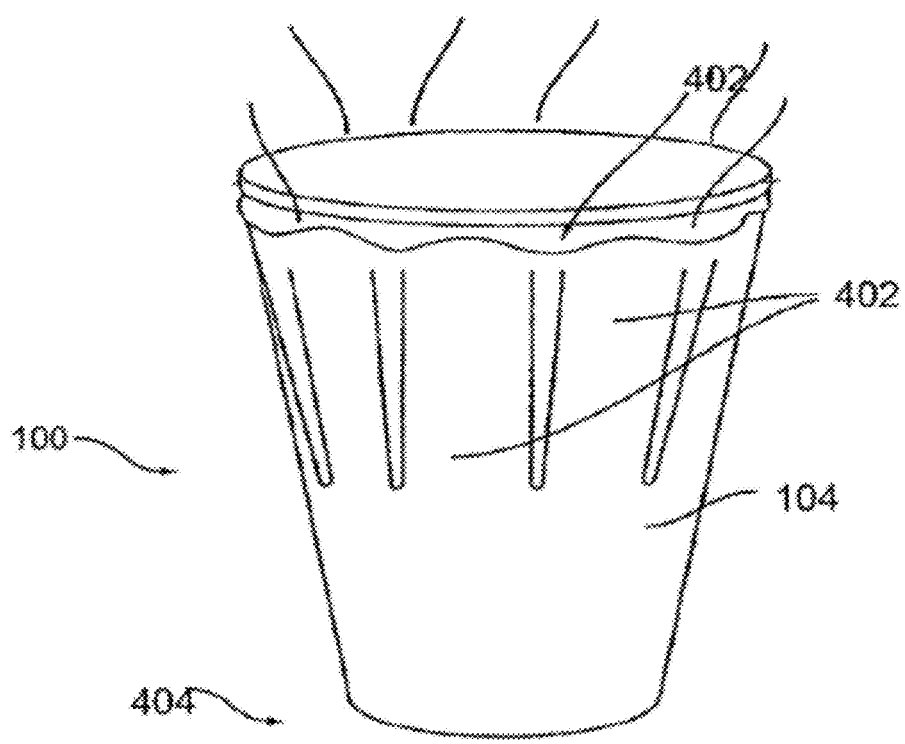
FIG. 15 is a perspective view of an integrated container with channels.

FIGS. 14 and 15 illustrate a container 100 with an outer wall 104. The container 100 may be constructed as a double-wall cup assembly. The container 100 may be a cylindrical cup, container sleeve or container having other geometrical configurations, including conical, rectangular, etc. The outer wall 104 may fully or partially cover the body of the container 100. The container 100 and outer wall 104 may be integrated into a double wall cup and the insulating material 216 and/or adhesive may be applied between the inner wall 102 and the outer wall 104. The insulating material may additionally have adhesive properties and thus may form the only attachment between the container and the blank. The outer wall 104 may be made of any nominal paper stock, including but not limited to, natural single-face, white-topped single face, coated bleached top single-face or any combination of these. Alternatively or additionally, the outer wall 104 may be made with foil, film, fabric, plastic, or other materials. The outer wall 104 and/or container may be repulpable, recyclable and/or biodegradable.

The outer wall 104 may include, for example, corrugated, flute (e.g., E-flute, F-flute, N-flute, or G-flute) uncorrugated or embossed air channels. The air channels may be in a vertical, diagonal, or other direction and may channel heat away from the hands. The air channels may be positioned parallel to each other. Additionally or alternatively, air channels may be formed by the application of the insulating material 216. For example, the insulating material 216 may be applied to the outer wall 104 in a striped, swirled, or dotted pattern such that air channels are formed or expanded before, during or after activation by, e.g., heat or pressure. The insulating material 216 may include blowing agents, foaming agents, and/or other agents that, upon activation, dissolve, generate gas, or disintegrate, and thus create air voids or foam structure.

The outer wall 104 may be removable from the container 100, such as a sleeve, or the outer wall 104 may be adhered to the container 100, such as in a double wall container. For example, a double wall container, such as a cup, or a double wall container sleeve may be manufactured by laminating the outer wall 104 onto the container or container sleeve blank, using an insulating material 216 (e.g., void containing, foamed, or other) to secure the insulating material 216, or may be secured by any other adhesive or sealing method. If the outer wall 104 is permanently attached to the container 100 during manufacture (e.g., creating an integrated double wall cup or double wall sleeve), it may increase efficiency by eliminating an assembly step by the commercial end-user. Further, it may decrease the amount of storage space required by the commercial end-user, e.g., storing one item as opposed to two.

The outer wall 104 may be removable from the container. For example, a die cut blank, such as a sleeve, may be manufactured to be stored separately and removable from the container 100.

The outer wall 104 may remain open ended on one side or on opposing sides, which may permit airflow. For example, in FIG. 14 the container may contain openings 302 near the top of the outer wall 104. For example, in FIG. 15, the container may contain openings 402 near the top or bottom 404 of the outer wall 104. The opening may be formed into the outer wall 104, for example as holes, and air channels may be created allowing air flow when the space between the inner wall 102 and the outer wall 104 is expanded by activation of the insulating material 216. Airflow may be further manipulated, for example, upward and away from the holding fingers by corrugated, flute corrugated, or other air channels created by the interaction of the insulating material 216 and the outer wall 104 or expandable material application pattern 216. For example, the pattern of application of the insulating material 216 may create air channels 304, 402.

FIG. 14 illustrates an alternate non-limiting example of how application of the insulating material 216 may form openings 302 near the top 306 of the container 100. The channels may be formed by expansion of the insulating material 216. There may be openings on opposing ends of the container 100, such as at the top 306 and the bottom 308. The openings may be formed by wrapping the outer wall 104 on the container without completing the seal at the top 306 or bottom 308.

Figure 16:
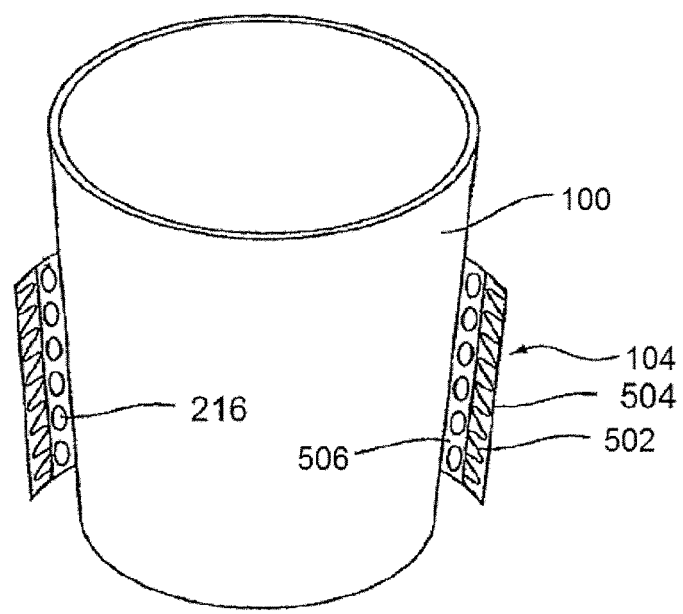
FIG. 16 is a cross section view of a sleeve with a cup.

FIG. 16 illustrates a cross section of an outer wall 104, such as a sleeve, assembled with the container 100. This figure is meant to be illustrative and not limiting. The cup may be replaced with any container, for example, a press-formed tray, a soup tub, or a bulk beverage container. The outer wall 104 may have an inner face 506 and an outer face 504. An insulating material 216 may be applied to the inner face 506, the outer face 504, and/or to a surface 502 between the inner face 506 and the outer face 504, such as to an inner wall of the sleeve. The inner face 506 and outer face 504 do not necessarily contain a space therebetween.

A insulating material 216, such as an expandable material, may be applied to an inner face 506 of the outer wall 104 in an inactive form. The inactivated insulating material 216 may be applied as a thin film that does not materially alter the thickness of the outer wall 104. Applying the insulating material 216 to the inside of the outer wall 104 may also maintain the printability of the outer face of the outer wall 104. If the inactivated insulating material 216 on the outer wall 104 is assembled, for example, with a standard paper cup, it may maintain the slim profile of the cup. Maintenance of the slim profile may retain the efficient nesting qualities of a standard cup, allowing it to be efficiently cased, crated and shipped. Additionally, activation of the insulating material 216 at end use may create manufacturing efficiencies by reducing the activation or foaming or curing step during manufacturing of the container or sleeve and thereby also reducing energy used during manufacturing.

The insulating material 216 may be activated and thereby expanded by, for example, adding contents 206, such as hot liquid, beverage or food into the container 100. Alternatively or additionally, the container 100 may be prefilled with contents 206, such as beverage or food and the insulating material 216 may be activated upon heating such as by microwave or water bath. Activation may occur only at the consumption stage and not at the processing stage of the outer wall 104, such that the outer wall 104 may be shipped to the consumer with a substantially inactivated insulating material 216. For example, the activation point of the insulating material 216 may be about 120° F. or higher and/or less than 60° F., such that the insulating material 216 may be activated only by the temperature of hot (or cold) liquids, beverages, or food and not activated by ambient or body temperature. The activation may cause the expandable material to expand and "push back" the outer wall 104 from the container 100 creating an increased air gap. The air gap may create a thermal barrier between the hot beverage container 100 and the hand of the consumer. The activation may also enhance the stiffness and/or rigidity of the container, which may allow for a reduction in the material or thickness of the container wall. As described in more detail below, the insulating material 216 may also be activated, or at least partially activated, before reaching the consumer. Consequently, this ability of the insulating material 216 to respond to target temperature can make the container or sleeve "smart" in the sense that it can increase its insulation as the packaged content 206 gets hotter.

The insulating material 216 may be applied to the outer wall 104 in an unexpanded state. Expansion of the insulating material 216 may not occur until activated by adding hot fluid or solids, such as at the point of serving. This may be different from expanding the material during manufacture of the outer wall 104. Expansion during manufacture may increase the bulk of the outer wall 104. The insulating material 216 may be controlled to effect nesting efficiency. The properties of the insulating material 216 may be further controlled by, for example but not limited to, combining an outer wall 104 constructed from fluted corrugate material with patterned application of insulating material 216 to provide specific insulation, air flow characteristics and container rigidity enhancement. For example, the corrugation and/or the pattern of insulating material 216 applied to the outer wall 104 may direct heat convection upward, and may therefore reduce heat transfer horizontally toward the holding hand of consumer. Alternatively, the insulating material 216 may be extruded into a sheet to which a pattern may be applied, such as by fluting, die-cutting shapes, lines, channels, or other markings into the sheet before attaching the sheet of insulating material 216 to an outer wall 104. In other implementations, expansion may occur before shipping, such as before, during or after the manufacturing of the container 100.

Figure 17:
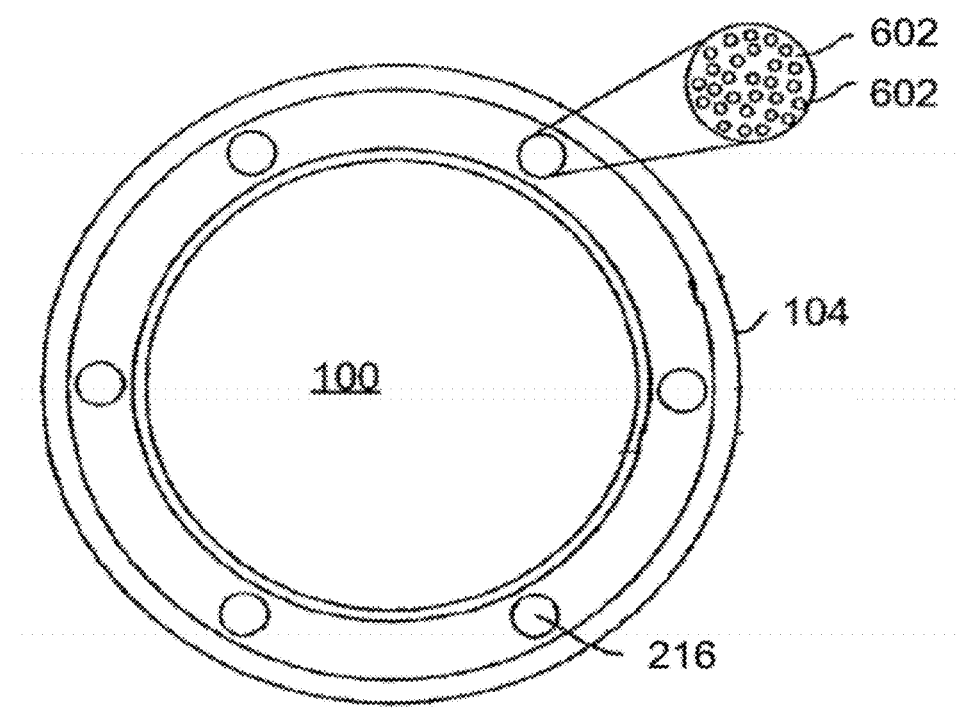
FIG. 17 is a top perspective view of a cross section of a cup assembled with an outer wall.

FIG. 17 is an exemplary top view of a cross-section of a container 100 assembled with an outer wall 104. This figure is illustrative only and not limiting. The insulating material 216 may be applied to an outer wall 104. For example, the insulating material 216 may be applied between the outer wall 104 and the wall of the container 100 and may form an integrated two-layer cup with thermally-activatable insulated expandable material in between, or between an outer wall 104 and an inner wall of a container sleeve. The insulating material 216 may include, for example, in situ air voids, or expandable microspheres or foaming agents 602 dispersed in a binder or any other suitable material disclosed above and may include an adhesive property.

Figure 18:
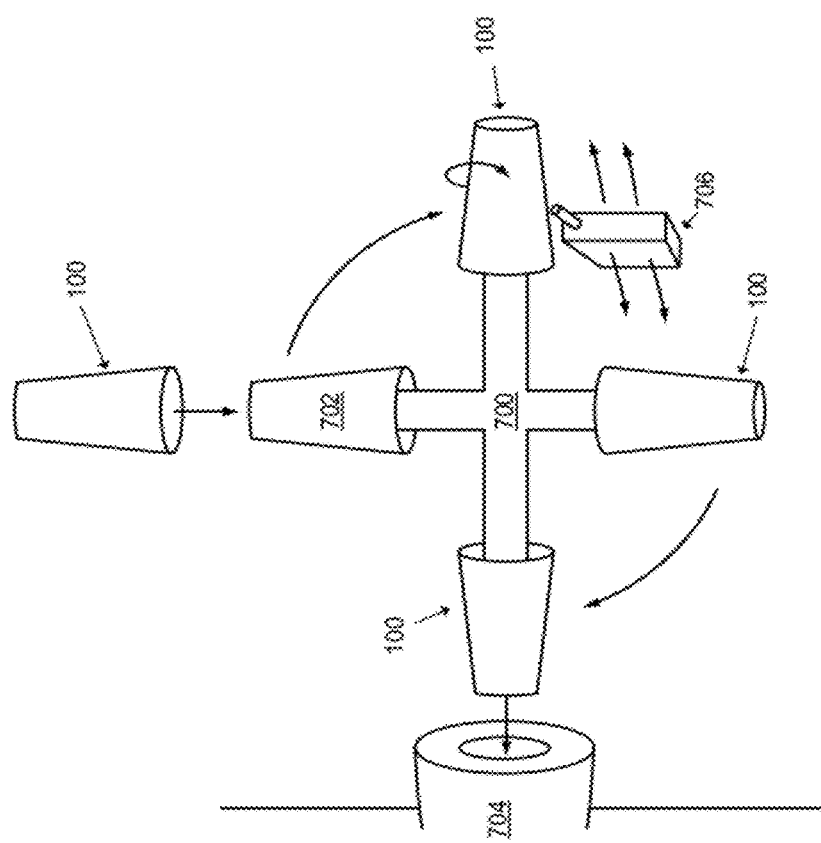
FIG. 18 is a view of a method of making a double wall cup.

FIG. 18 illustrates an exemplary method of applying the insulating material 216 to a container 100. The method may be adapted to a cup wrapping machine. In this example, the insulating material 216 may be applied continuously or intermittently via an applicator 706 such as a nozzle, glue gun, or slot die applicator onto the outside of, e.g., a paper cup 100 which may be secured to a mandrel 702. The pattern may be manipulated by movement of the container 100 relative to the applicator 706. For example, the mandrel 702 may be spun and/or moved up or down or in another direction to achieve a desired pattern, e.g., spiral, dotted, lined, and etc.

Alternatively or additionally, the applicator 706 may move relative to the container 100 to achieve a desired pattern. For example, mandrels 702 may be arranged on a rotating arm 700. Containers 100 such as cups may be loaded onto the mandrel 702 manually or by machine feed. The arm 700 may move the container 100 proximate to the applicator 706. The applicator 706 may apply patterns of insulating material 216 to the container 100 by moving relative to the container 100. The mandrel 702 may also move the container 100 relative to the applicator 706, such as by rotation. As an example, stripes may be applied to the cup by side to side movement of the applicator 706 combined with rotational movement of the mandrel 702. The spray from the applicator 706 may be constant or intermittent and may create broken lines, stripes, dots, or ellipses of foam. Swirls may be applied by constant spray from the applicator 706 combined with side movement and rotation of the mandrel 702.

The applicator 706 may be attached to a line which may deliver the insulating material 216. Gas, such as nitrogen gas, may be added to the insulating material 216 by a separate line and mixed in the applicator 706, or during application, or in the applicator feed line, or otherwise.

After the insulating material 216 has been applied, the arm 700 may move the container 100 to a different position where the cup may be removed from the mandrel for further processing. For example, an integrated double wall container, such as a cup, may be formed by inserting the container 100 into an outer wall 104. The outer wall 104 may be preformed and located in a cavity 704 into which the container 100 may be inserted.

Figure 19:
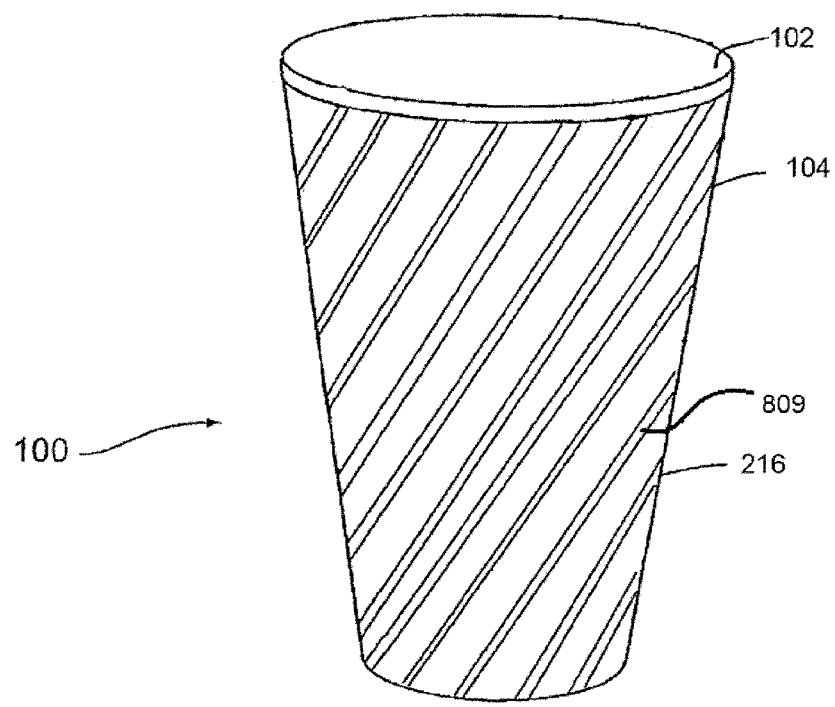
FIG. 19 is a view of a cup with insulating material applied in a pattern.

FIG. 19 illustrates an exemplary outer wall 104 blank. This drawing is illustrative and not meant to be limited to a size or shape. The size and shape may be adapted to the dimensions of any container. An insulating material 216 may be applied to the outer wall 104. The insulating material 216 may be applied by a number of methods, such as but not limited to, a nozzle spray gun, printing, a slot coater, or other methods, such as those described above or in more detail below. Alternatively or additionally, the insulating material 216 may be extruded into a sheet and may be applied to a container, container sleeve, or die cut blank by laminating the sheet of insulating material to the blank of the container, container sleeve, or die cut blank. The insulating material 216 may be applied to the outer wall 104, for example, on an in-line cup wrapping machine, in-line on a folder/gluer, or by other suitable methods, such as off-line coating and drying. The insulating material 216 may be applied to the outer wall 104 in any suitable pattern, such as but not limited to, banded, dotted, waved, squares, circles, diamonds, random, a combination of these or any other pattern. For example, the insulating material 216 may be applied in a pattern that manipulates air flow and/or conducts heat, for example, vertically upward away from the holding fingers. The insulating material 216 may be applied such that it forms channels, or expands to form channels on activation. The channels may direct natural convection. The insulating material 216 may fully or only partially cover the surface being coated.

The outer wall 104 may be removably or permanently attached to a container 100 or cup by, for example, wrapping the outer wall 104 around the container 100. For example, a double wall cup or container 100 may be manufactured by laminating the outer wall 104 onto the container, using an insulating material 216 such as a starch based material, a hot melt and expandable material, an expandable material with adhesive properties, a combination of these or any other adhesive or sealing method. If the outer wall 104 is permanently attached to the container 100 during manufacture (for example, creating an integrated double wall cup), it may increase the efficiency of using an outer wall 104 by eliminating an assembly step by the commercial end-user. Further, it may decrease the amount of storage space required by the commercial end-user (storing one item as opposed to two). The shape of the outer wall 104 in the drawing is not meant to be limiting. The shape of the outer wall 104 may be adapted to the shape of other containers, for example but not limited to, a container sleeve, a soup tub, press-formed container, or bulk beverage containers. Alternatively the container 100 may be a container sleeve that is open on both ends.

The outer wall 104 may, optionally, contain in-seam hot-melt or cold-set glue. If the insulating material 216 is also an adhesive, the in-seam hot-melt or cold-set may be omitted. The in-seam hot-melt/cold-set glue may be used in addition to the insulating material 216, such as, for bonding reinforcement. The outer wall 104 may be applied to a container 100, such as a cup or sleeve by, for example, wrapping, laminating, or other manufacturing processes.

FIGS. 19 through 22 illustrate many examples of an outer wall 104. These examples are merely illustrative and not limiting. FIG. 19 illustrates outer wall 104 with insulating material 216 applied in a pattern 809 to channel the release of heat. The insulating material 216 may be made of, for example, corrugated paper, such as but not limited to fluted corrugate. Convection may be manipulated by corrugation, the pattern of application of the insulating material 216, or in another suitable manner.

Figure 20:
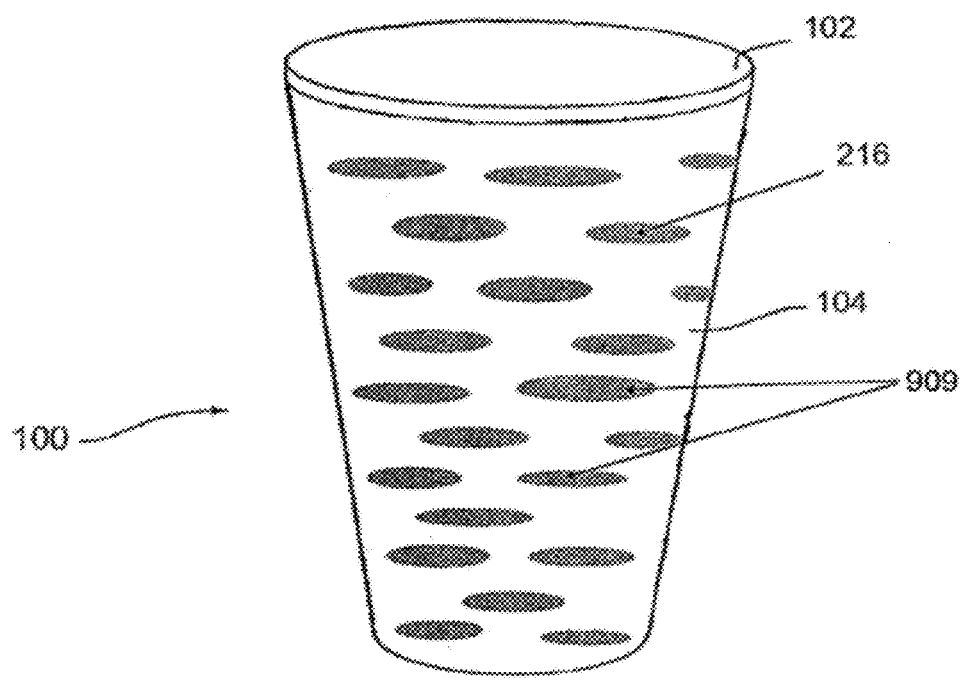
FIG. 20 is a view of a cup with insulating material applied in a pattern.
Figure 21:
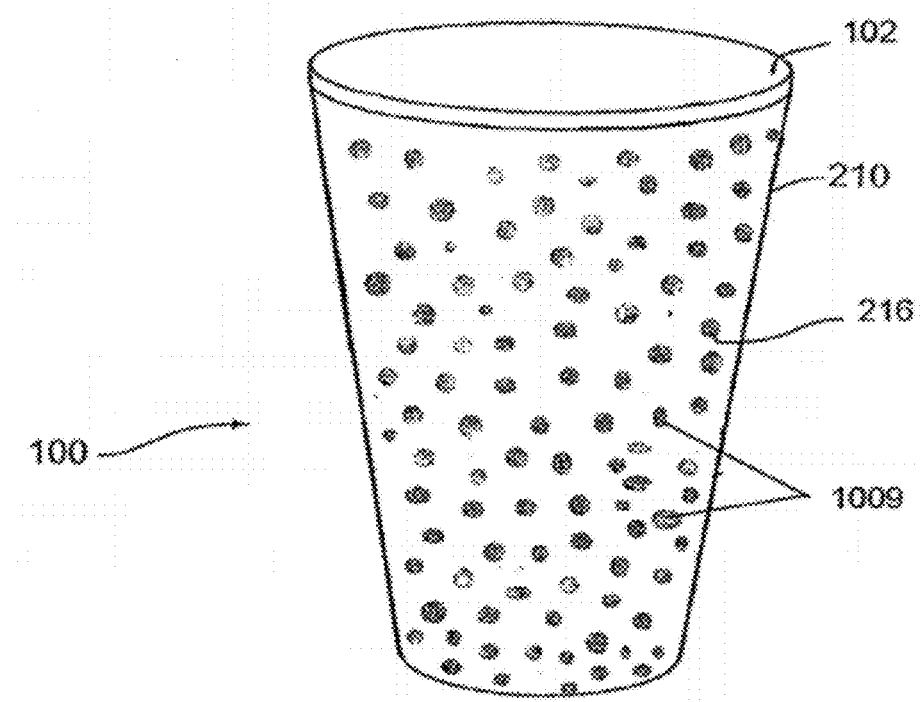
FIG. 21 is a view of a cup with insulating material applied in a pattern.
Figure 22:
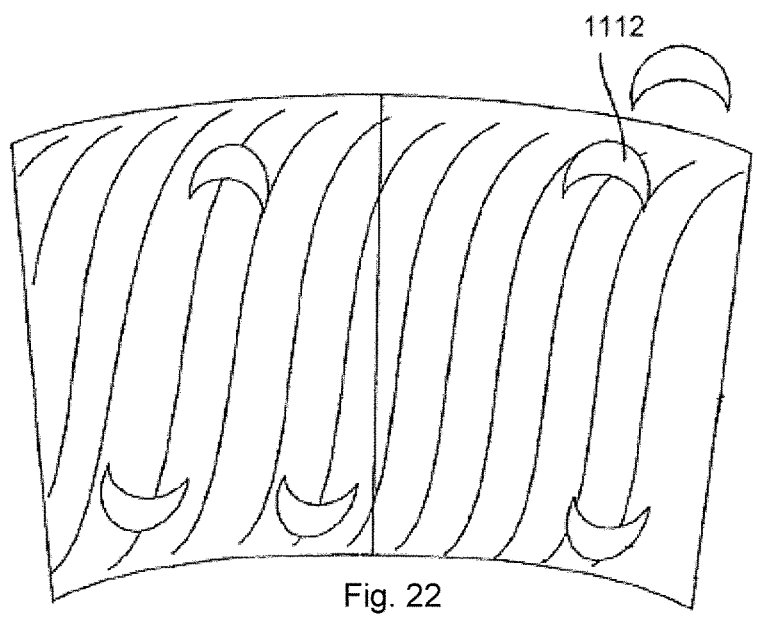
FIG. 22 is a view of an outer wall disassembled from a cup.
Figure 23:
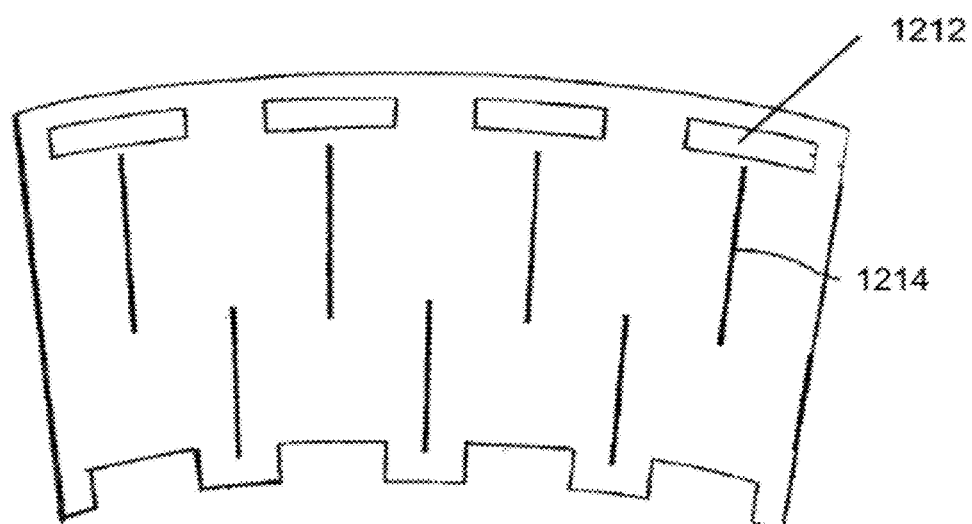
FIG. 23 is a view of an outer wall disassembled from a cup.
Figure 24:
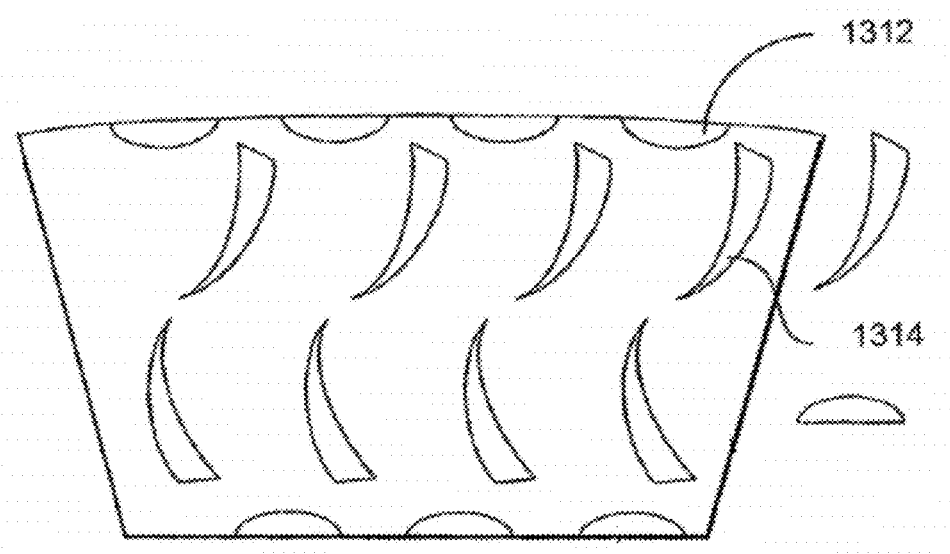
FIG. 24 is a view of an outer wall disassembled from a cup.
Figure 25:
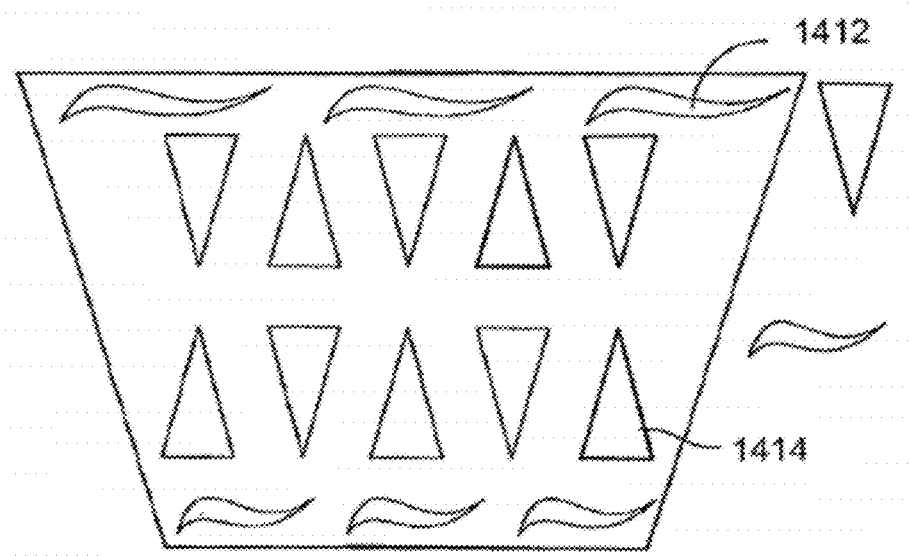
FIG. 25 is a view of an outer wall disassembled from a cup.

FIGS. 20 through 21 illustrate other possible, non-limiting examples of potential patterns of insulating material 216. The patterns of insulating material 216 are represented by numbers 909 and 1009, respectively. The insulating material 216 may be applied in patterns other than those illustrated in FIGS. 19-21. The insulating material 216, may vary in thickness and may provide graduated flow to channel heat to openings.

FIGS. 22-25 illustrate patterns of openings that may be used to allow air flow. Openings are represented by numbers 1112, 1212, 1312, and 1412, respectively. Openings may also be located and/or include shapes such as illustrated by numbers 1214, 1314, and 1414. There may be die cut openings at opposing ends of the blank, or only at one end. The shapes of the openings in FIGS. 22-25 are illustrative only and not limiting. For example, the patterns of insulating material 216 and the shape of the openings may be so arranged as to manipulate air flow, for example but not limited to, creating a Venturi effect.

Figure 26:
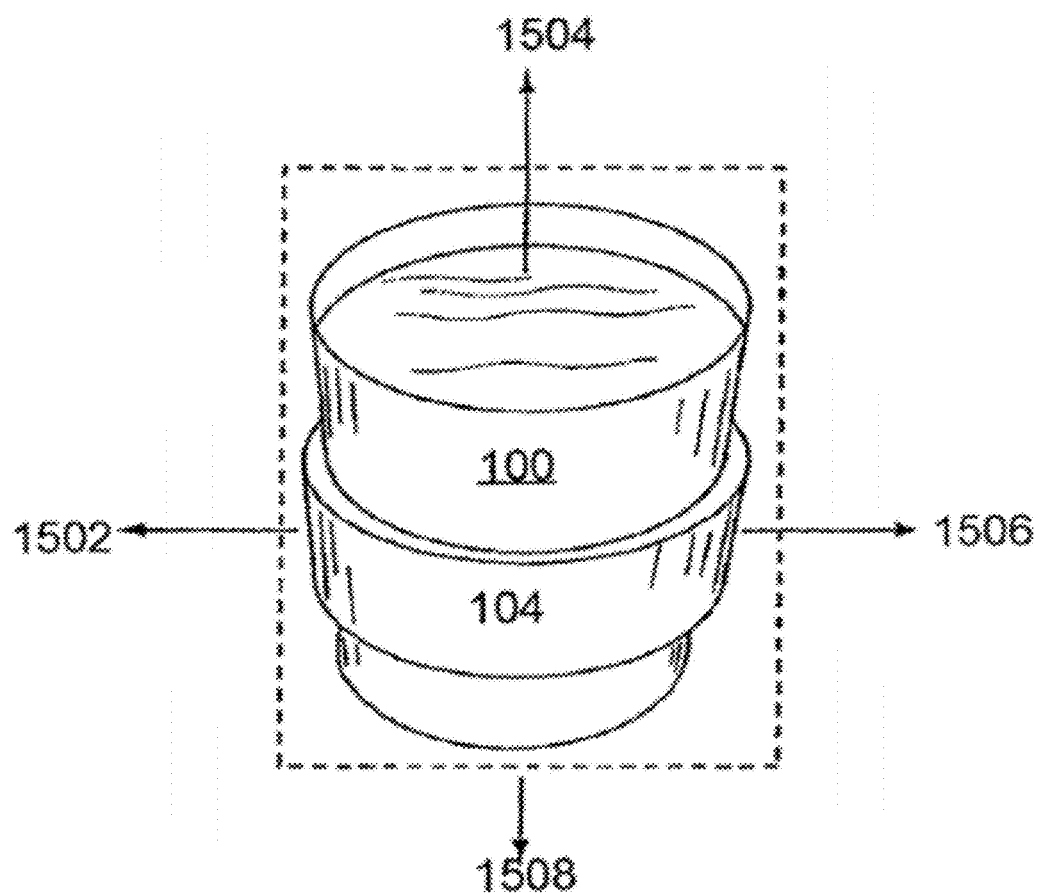
FIG. 26 is a view of a cup assembled with a sleeve illustrating heat transfer.

FIG. 26 is an illustrative example showing exemplary heat transfer. This example is not meant to be limiting, but merely illustrative of possible heat loss manipulation. Total heat loss of the system may be represented by the following equation:

$$Q^T[\text{Cal./second}] = Q_1 + Q_2 + Q_3 + Q_4$$

Where $Q^T$ is the total heat loss. $Q_1$ 1504 may be the heat loss due to water evaporation. $Q_2$, $Q_3$, and $Q_4$, represented by 1502, 1506, and 1508, respectively, may represent the convectional and conductional heat loss.

The objective of keeping contents hot may be achieved by minimizing $Q^T$. The outer wall 104 may minimize $Q^T$ by minimizing $Q_2$, $Q_3$, and $Q_4$. The low thermal conductivity of the insulating material may result in much lower heat loss due to $Q_2$, $Q_3$, and $Q_4$.

The objective of preventing consumer flesh burns may be achieved by, for example, minimizing $Q_2$, $Q_3$, and $Q_4$, especially $Q_2$, $Q_3$, while allowing $Q_1$ and $Q_4$ to channel the unavoidable high heat flux (due to the hot liquid) vertically up or down This may be achieved by, for example, adding corrugated grooves to the outer wall 104. The grooves may be, for example, in a generally vertical or diagonally tilted.

Non-limiting examples follow.

EXAMPLE 1

Figure 30:
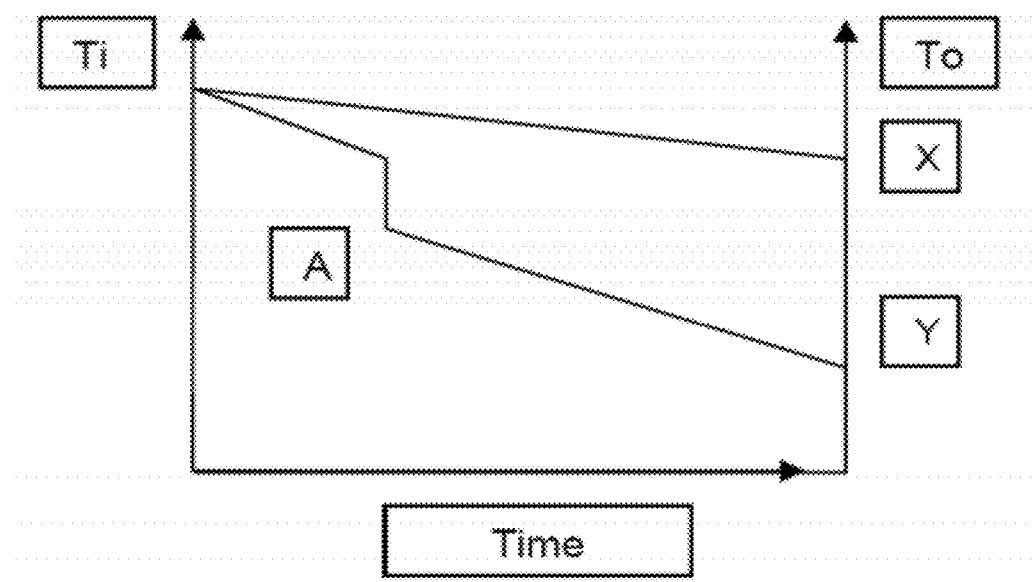
FIG. 30 is an example graph showing a thermal conductivity of example containers.

FIG. 30 provides a graphical representation of how the insulating material 216 may alter thermal conductivity. The temperature on the inside of a cup may be represented by Ti. The temperature on the outside of the cup may be represented by To. The top line, X, may represent a container without the coated outer wall 104. The second line, Y, may represent a container assembled with a coated outer wall 104. This example may illustrate that, in a container without an outer wall 104 coated with the insulating material 216, the difference in the temperature inside versus the outside of the container may be very small. In a container with an outer wall 104 coated with the insulating material 216, the difference in the temperature between inside and outside may be small when the hot food or beverage is added to the container. However, the food or beverage may activate the material, A, on contact, causing the material to expand. When the material expands, the difference in temperature Ti–To, may increase.

EXAMPLE 2

Example 2 illustrates temperature sensory comparison of various outer wall 104 materials coated with the insulating material 216 compared to without the insulating material 216. The following experiment is for illustration only and is not limiting, other experimental results might be obtained.

An insulating material 216, such as a thermally, or other, expandable material may be applied to outer wall 104 blanks made of various materials, such as but not limited to paper, paperboard, and fluted corrugated paper. Each outer wall 104 blank may be wrapped around a container, such as a cup. The cup may be filled with hot water. The cups may then be handled with bare hands and a comparison made between the sensory responses to the two conditions. In each test, the cups with coated outer wall 104 were less "hot" to the touch than those with uncoated outer wall 104. Expansion occurred within a few minutes of pouring hot water into the cup.

EXAMPLE 3

Coatings of insulating material 216 may be applied to a single face medium. The coating may be expanded when wet using a MASTER-MITE 120 V, 475 W heat gun at 600 degrees F.

EXAMPLE 4

Coatings of insulating material 216 may be applied to the outside of a 12 Oz cup and allowed to air-dry overnight. The next day, 190 degree F. hot water may be poured into the cup. Noticeable expansion may be observed shortly after filing the 190 degree F. hot water into the cup. Lids may be placed on the cup, and after 7 minutes more expansion may be observed, but still partial expansion. A benefit of post-heat activation may be that the hotter the liquid the more the coating expands.

EXAMPLE 5

A coating of an insulating material 216 was applies to a cup. A 250 W IR heater manufactured by Fisher Scientific model no. 11-504-50 may be used to heat the insulating material 216. Expansion may be slow when the lamp is six inches away from the insulating material 216 and immediate when one inch away from the insulating material 216.

EXAMPLE 6

Coatings of insulating material 216 may be applied to paper, which may them be wrapped around a paper cup after the coating is allowed to air dry. Heat from a heat gun may be used to heat the part of the insulating material 216 coating indirectly through the paper shell for one minute. The coating expanded. Another part of the unheated insulating material 216 coating may be heated under an IR lamp through the paper. The insulating material 216 coating expanded.

EXAMPLE 7

An insulating material 216, such as a heat expandable coating, may be applied within the walls of a double wall sleeve or container, such as a cup. During manufacture, the insulating material 216 may be adequately dried but not expanded, or not fully expanded. When the sleeve or container is exposed to high temperature, such as the temperature of coffee or soup, the insulating material 216 may expand pushing the walls of the double wall sleeve or container away from each other. This expansion through activation may "smartly" increase the air voids in the insulating material 216 as well as the insulation and rigidity of the package. The following details an experiment illustrating how use of the insulating material 216 decreases a weight of a material used in the manufacture of a container or container sleeve. Although the experiment employs a limited set of materials, they demonstrate the feasibility and benefits of the insulating material 216.

Figure 31:
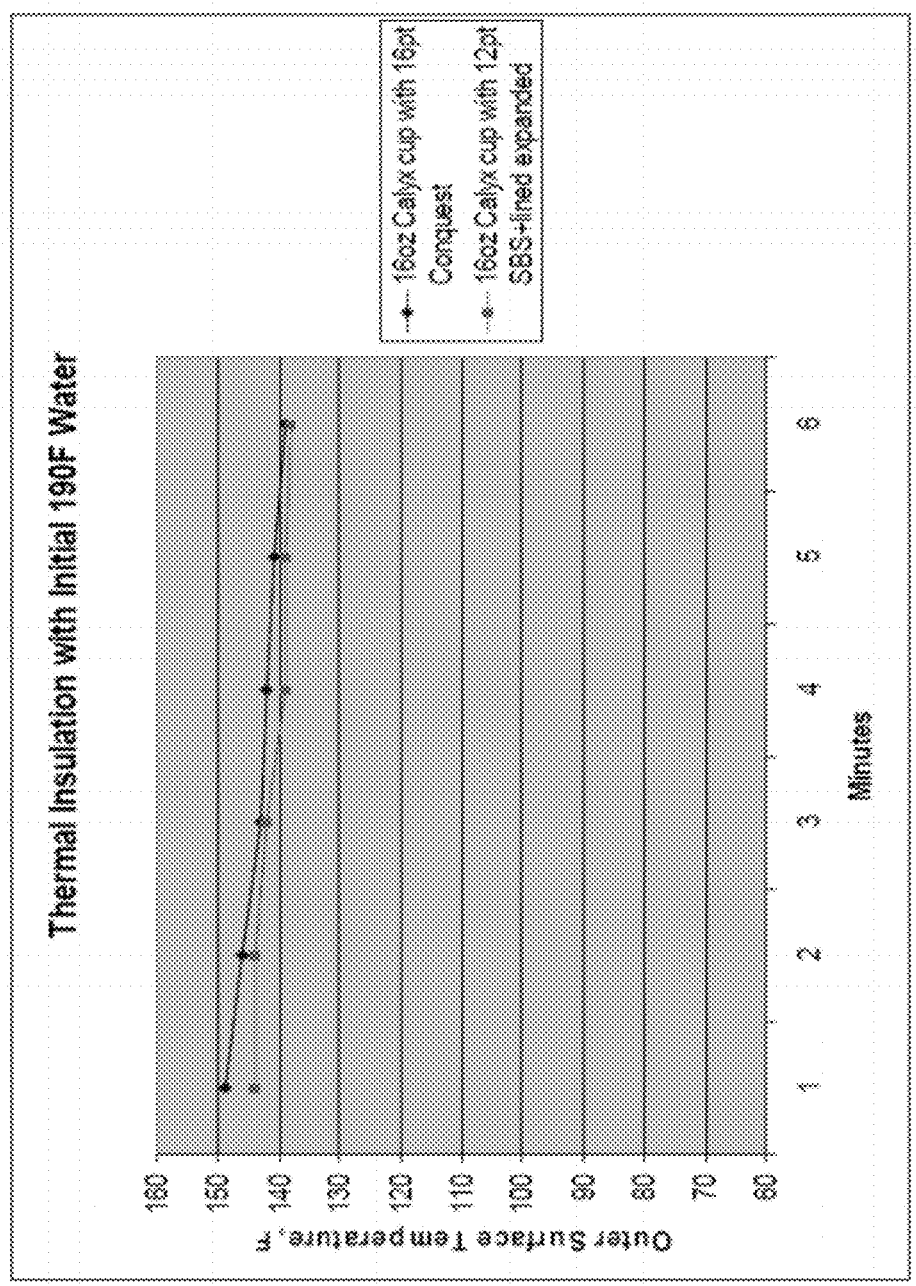
FIG. 31 is an example graph showing thermal insulation of example containers.

Two samples were compared. The reference container was a 16 ounce disposable cup with a 16 pt outer wrap. The experimental container was a 16 ounce disposable cup with a pattern of insulating material 216, in this case a foam coating, and a 12 pt outer wrap. Both cups were filled with 190° F. water. The insulating material 216 of the experimental container expanded upon addition of the 190° F. water. The outer surface temperature of each cup was measured and plotted in FIG. 31. The experimental cup displayed improved insulating properties during the first few minutes of the experiment.

Figure 32:
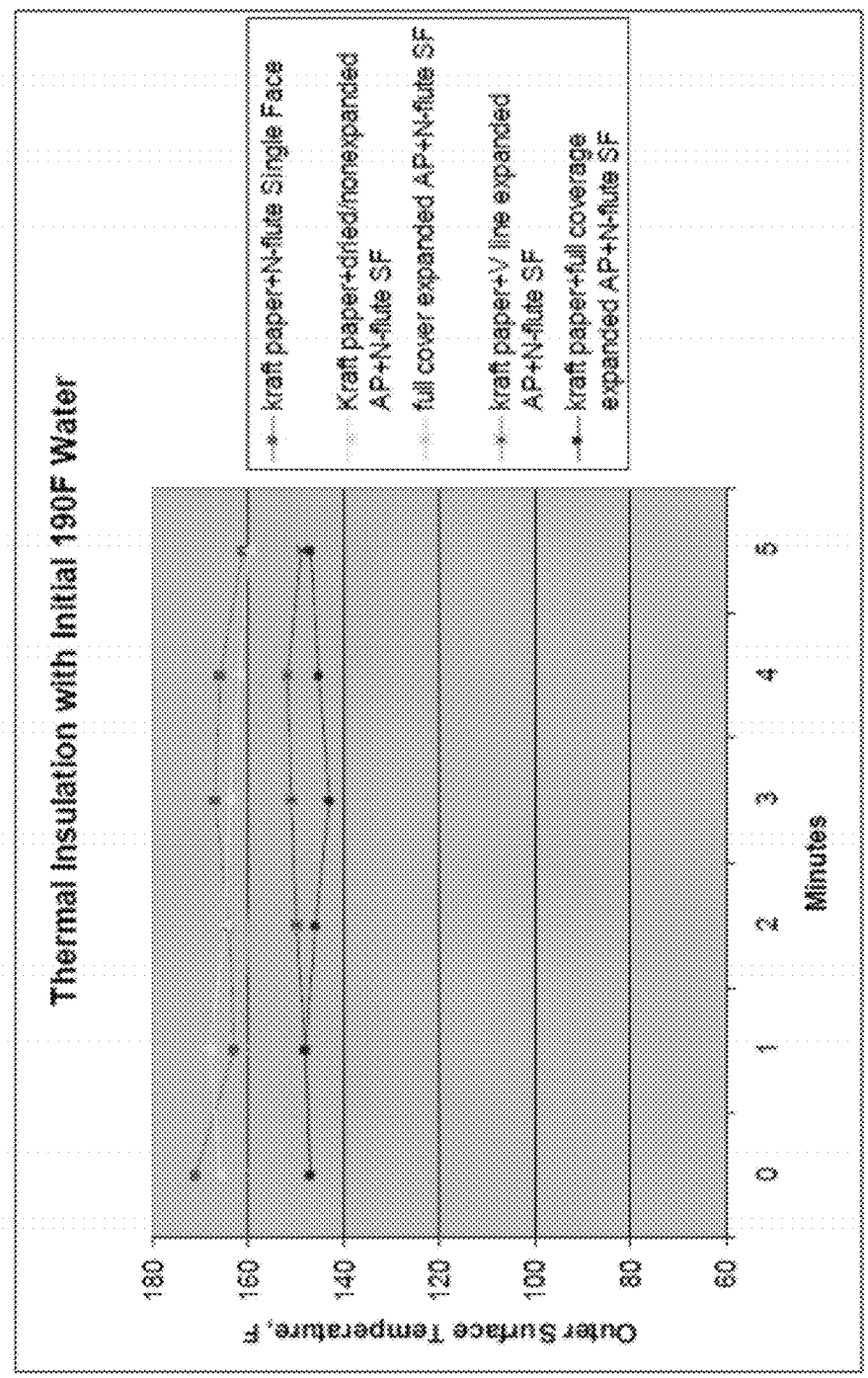
FIG. 32 is an example graph showing thermal insulation of example containers.

A second trial illustrated the use of container sleeves. The reference container sleeve was an N-flute single face sleeve. The experimental container sleeve was an N-flute single face sleeve with an inside layer of insulating material 216, in this case, foam coating. A layer of kraft paper was laminated over the layer of insulating material 216 and the material was dried, but not expanded. The insulating material 216 was applied in two patterns: full coverage and lines running from the top to the bottom of the sleeve. To summarize, there were five formats of container sleeves tested:

N-flute single face sleeve with inner layer of kraft paper
N-flute single face sleeve with inner layer of dried non-expanded heat activatable aqueous coating ("AP") and an inner layer of kraft paper
N-flute single face sleeve with inner layer of expanded heat activatable aqueous coating and no layer of kraft paper
N-flute single face sleeve with inner layer of expanded heat activatable aqueous coating arranged in vertical lines and inner layer of kraft paper N-flute single face sleeve with a full coverage inner layer of expanded heat activatable aqueous coating and inner layer of kraft paper The sleeves were applied to a 16 oz disposable cup which was filled with 190° F. water. After filling, the temperature of the outside of the cup was tested at one minute intervals for 5 minutes. The results are charted in FIG. 32.

The cups and sleeves containing the foam coatings also had higher rigidity, even at a reduced paper stock. The patterned foamed coating prevented even the 12 pt outer wrap from collapsing into the inner wall during handling. This may allow the use of lower basis weight and caliper paper board while maintaining good insulation.

Figure 27:
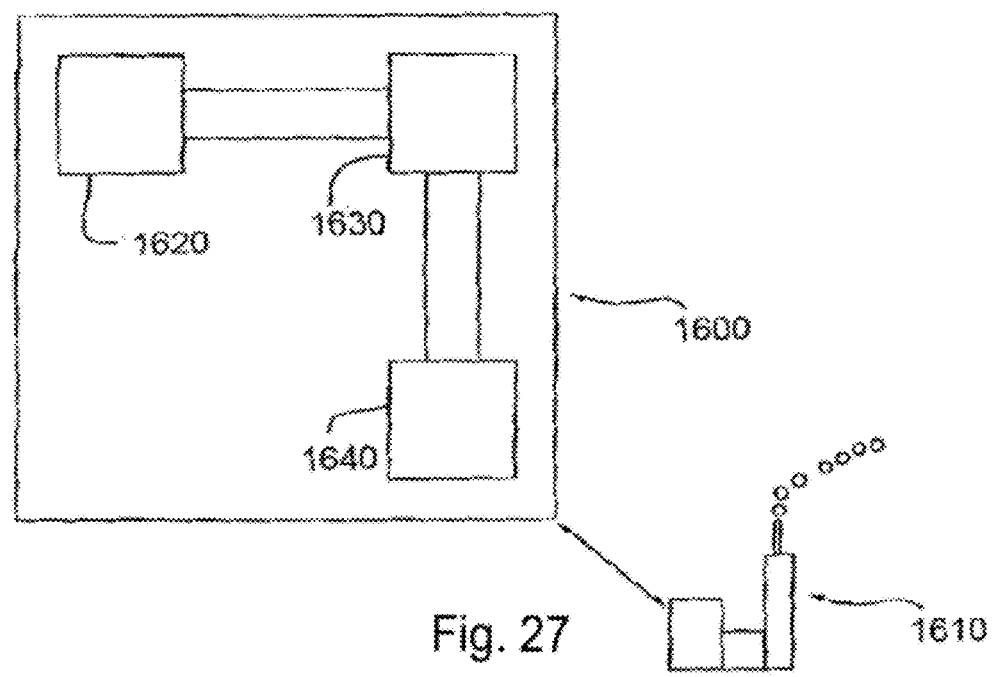
FIG. 27 is a block diagram of an exemplary process for applying an insulating material to substrates.

FIG. 27 is a block diagram of an exemplary process for applying a micro-particle coating to substrates. The process may include applying a microsphere or other expandable coating to any of a substrate, die cut blank, container, sleeve, catering trays, double-wall cups, press-formed tray, soup tub and bag-in-the box containers. The process may include inline 1600 and off-line 1610 procedures. The inline procedure 1600 may include stacking stations 1620, manufacturing stations 1630, and packaging stations 1640 used for the manufacturing of the container from paper or die cut stock. The stacking, manufacturing and packaging stations may be completely automated and/or include manual stations.

Coating application processes may occur in-line 1600 or offline 1610, at the same or another facility. In-line application may include the application of the insulating material 216 at one or more of the stacking stations 1620, manufacturing stations 1630, and packaging stations 1640. The insulating material 216 may be applied in various ways, including but not limited to brushes, sponges, printing, a nozzle, spray, a slot die coater, or by lamination to an extruded sheet of coating. Any of these applications, or various combinations of them, may occur in-line 1600 or offline 1610, where the off-line process may occur before the stacking stage 1620.

Application with a brush or brushes may occur by feeding the insulating material with pressure through a tube to the brush. The brush may be manufactured from different materials such as horse hair or synthetic materials. The brush may include hollow filaments such that the insulating material is applied through the filaments. The brush may apply a swatch or pattern of the insulating material. The amount of insulating material to the brush may be controlled such that the amount of insulating material applied to the substrate may be metered. As an illustrative and not limiting example, the amount may be controlled such that a $1/64^{th}$ inch layer of insulating material is applied, which may expand to $1/16$ or $1/32$ of an inch, or the distance of the gap between an inner and outer layer of a double-wall cup. It may be preferable that the insulating material does not deform a shape of the outer layer once expanded. The insulating material 216 may be distributed in a uniform or varying pattern. The brush may be used for broader applications, such as to coat the inside of a bag-in-the-box container.

Application with a printing press may occur by running substrates through rollers. The substrates may be roll or web form of paper stock, or alternatively in sheet form. The insulating material 216 may be press applied in spots or patterns or with full coverage, depending on an implementation.

Figure 28:
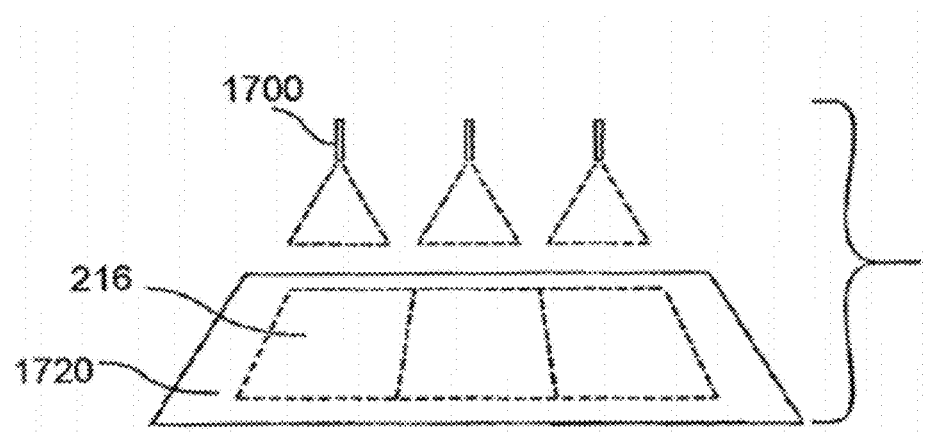
FIG. 28 is a schematic of applying an insulating material to a substrate with spray nozzles.

In FIG. 28, spray nozzles 1700 may be used to apply an insulating material 216 to a substrate 1720. The nozzles may diffuse the insulating material to apply a thin, uniform layers of the insulating material 216 on the substrate. One or more spray nozzles may be used to form continuous or interrupted patterns of the insulating material 216. The nozzles may be arranged such that the applied insulating materials 216 overlap, are side-by-side and/or are separated by a space. The spray may be metered to control a thickness of the applied insulating material 216. The nozzle may also be positioned to direct spray of the insulating material 216 onto designated portions of the substrate, such as at a corner.

Figure 29:
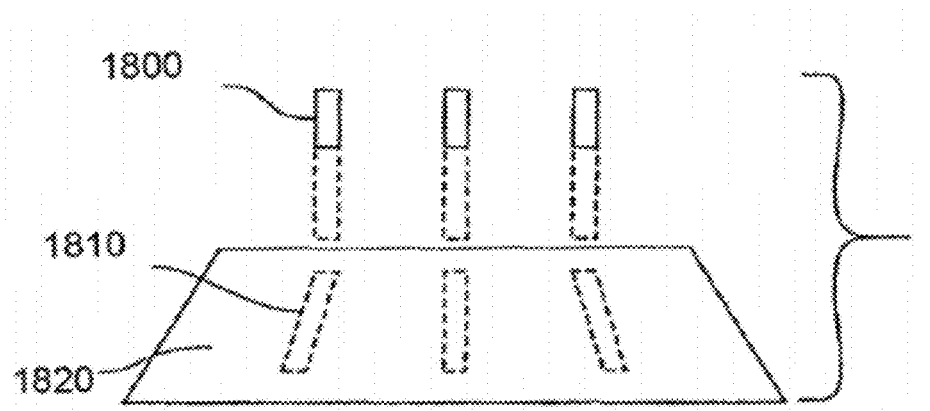
FIG. 29 is a schematic of applying an insulating material to a substrate with non-spray nozzles.

In FIG. 29, non-spray nozzles 1800 may be used to apply a stream 1810 of insulating material 216 to the substrate 1820. The stream may be metered through the nozzle to apply a precise amount. The nozzle may be sized to control a specified width and height of the stream 1810. Flow from the nozzles may be turned on and off to accommodate a specified pattern of the insulating material 216 to the substrate.

In a trough or a dip insulating material 216 application, substrates may be moved through the trough that contains insulating material 216. One or both sides of the substrate may be run through the trough. A thickness of the insulating material 216 being applied to the trough may be controlled by how long the substrate sits in the material. A temperature of the insulating material 216 and substrate may be controlled to activate or not activate the expandable insulating material 216 during the application process. A control blade may be used to meter off excess insulating material 216. The substrates may be belt fed though the through or individually held in the trough.

With any of the above application processes, and with any other process, the applied insulating material 216 may be dried or set, such as by applying or blowing cool air or warm air without activating the insulating material 216, if it is desired to expand the insulating material 216 in a later process, such as during manufacturing or at the time of consumer use. The insulating material 216 may also be expanded after manufacturing and before consumer use, such as at the stacking station. The insulating material 216 may be expanded before or after stacking the containers.

Coated or uncoated blanks may be fed to the stacking station. The insulating material 216 may be applied during in-line or off-line processing. If applied in-line, the insulating material 216 may be allowed to dry before the cups, sleeves, containers, etc. are formed, or they may be formed while the insulating material 216 is wet. Depending on the properties of the insulating material 216, it may take a couple of seconds to several minutes to dry. The insulating material 216 may be activated during the in-line manufacturing or afterwards, such as at the consumer stage. To activate the insulating material 216 in-line, any or all of infrared (IR), air, convection or conductive heating methods may be used. The insulating material 216 may take a couple of seconds to several minutes to fully expand. For example, a mandrel, which holds a container from the inside of the container, and/or a collar, which holds a cup from the outside of the container, may be used to apply heat to expand the insulating material 216 during the container manufacturing process. If a wet or partially dry insulating material 216 contacts the mandrel during process, the mandrel may be manufactured to include a non-stick material, such as TEFLON to prevent sticking or transfer of the insulating material 216 onto the mandrel. Lower activation temperatures may be preferred if the activation occurs in-line. By activating the insulating material 216, the insulating material 216 expands to form a reinforced air gap. The insulating material 216 may be partially expanded during manufacturing of the container, and then the expansion may continue to the consumption stage.

As mentioned, use of the insulating material 216 may help to reduce the thickness of substrate needed to make the container, sleeves, etc., while maintaining a better rigid feel to the consumer. The insulating material 216 may also improve insulation properties of the container, and to help keep the beverages or foods warm or cold longer, depending on the application. The substrates may be made of natural fibers, synthetic or both, such as SBS (solid bleached sulfate) paper board or box board. A sleeve materials, such as liner and medium, may be produced of 15 LB/3000 ft$^2$ to 100 LB/3000 ft$^2$ material, and preferably 18 LB/3000 ft$^2$ to 50 LB/3000 ft$^2$. The caliper of the paper substrate for hot or cold cups, soup tub, press-formed container and other non-corrugated containers may range from 9 point to 24 point, and preferably 10 point to 24 point, where a point is equal to $\frac{1}{1000}$ inch.

While various embodiments of the invention have been described, it will be apparent to those of ordinary skill in the art that many more embodiments and implementations are possible that are within the scope of the invention.

We claim:

1. A clamshell container comprising:
a bottom portion including a bottom wall and a side wall attached to the bottom wall, the bottom wall and the side wall forming a bottom recessed area;
a top portion connected with the bottom portion along a fold line, the top portion configured to fold over at least part of the bottom portion at the fold line to form a storage area between the top portion and the bottom recessed area, the top portion and the bottom portion being constructed of a first layer and a second layer attached to the first layer to form an airgap therebetween; and
expanded insulation that engages both the first layer and the second layer to adhere the first layer to the second layer, the expanded insulation disposed in a pattern within the air gap to define air channels, and the expanded insulation being formed from an insulating material including expandable microspheres having an activation temperature not exceeding 190° F., the expanded insulation including expanded, non-ruptured microspheres.

2. The clamshell container of claim 1, where the bottom portion is configured to attach to the top portion along an attachment edge of the top portion when the top portion is folded over the at least part of the bottom portion, the attachment edge opposite the fold line.

3. The clamshell container of claim 1, and where the top portion includes a top recessed portion, and where the storage area is formed between the top recessed area and the bottom recessed area.

4. The clamshell container of claim 1, where the bottom wall includes a ridge that divides the bottom recessed area.

5. The clamshell container of claim 1, where the first layer is a flat paperboard layer; and where the second layer is a corrugated paperboard layer.

6. The clamshell container of claim 1, where the expanded insulation is positioned at intervals between the first layer and the second layer.

7. The clamshell container of claim 1, where the first layer and the second layer are selected from the group consisting of paper and paperboard.

8. The clamshell container of claim 7, where the first layer comprises uncorrogated paper or paperboard, and where the second layer comprises uncorrugated paper or paperboard.

9. A clamshell container, comprising:
a bottom portion comprising a plurality of walls forming a bottom recessed area;
a top portion comprising a plurality of walls forming a top recessed area, the top portion connected to the bottom portion along a fold line, the top portion and the bottom portion comprised of a first layer and a second layer attached to the first layer to form an airgap therebetween; and
expanded insulation that engages both the first layer and the second layer to adhere the first layer to the second layer and to create air gaps between the first layer and the second layer, the expanded insulation being formed from an insulating material including expandable microspheres having an activation temperature not exceeding 190° F., the expanded insulation including expanded, non-ruptured microspheres.

10. The clamshell container of claim 9, wherein the microspheres have an activation temperature greater than 150° F.

11. The clamshell container of claim 9, further comprising:
an adhesive material different than the expanded insulation, the adhesive material arranged between the first layer and the second layer and bonded to both the first layer and the second layer.

12. The clamshell container of claim 11, wherein the adhesive material is a hot melt adhesive.

13. The clamshell container of claim 11, wherein the adhesive material is a cold melt adhesive.

14. The clamshell container of claim 9, wherein the first layer and the second layer form a wall assembly, and wherein the wall assembly includes at least a portion thereof formed of a coated stock material.

15. The clamshell container of claim 9, wherein the expanded insulation further comprises a synthetic binder material, wherein the synthetic binder material is a thermoplastic binder, and wherein the microspheres are disposed in the thermoplastic binder.

16. The clamshell container of claim 9, wherein the expanded insulation further comprises a natural binder material, wherein the natural binder material is a starch-based material, and wherein the microspheres are disposed in the starch-based material.

17. The clamshell container of claim 9, wherein the insulating material has a thickness in an expanded state that is approximately 100-400% greater than a thickness in an unexpanded state.

18. The clamshell container of claim 9, wherein the insulating material has a thickness of approximately $\frac{1}{64}$th of an inch in an unexpanded state.

19. The clamshell container of claim 9, wherein the expanded insulation has a thickness of approximately $\frac{1}{32}$nd of an inch.

20. The clamshell container of claim 9, wherein the expanded insulation has a thickness of approximately $\frac{1}{16}$th of an inch in the expanded state.

21. The clamshell container of claim 9, wherein the microspheres of the insulating material that forms the expanded insulation are microwave activated.

22. A clamshell container, comprising:
a bottom portion comprising a plurality of walls forming a bottom recessed area;
a top portion comprising a plurality of walls forming a top recessed area, the top portion connected to the bottom portion along a fold line, the top portion and the bottom portion comprised of a first layer and a second layer attached to the first layer to form an airgap therebetween;

expanded insulation engaging both the first layer and the second layer to adhere the first layer to the second layer and to create air gaps between the first layer and the second layer, the expanded insulation being formed from an insulating material including expandable microspheres having an activation temperature not exceeding 190° F.;

wherein the expanded insulation comprises expanded, non-ruptured microspheres when the second layer is permanently attached to the first layer.

* * * * *